US008122996B2

(12) United States Patent
Kajihara et al.

(10) Patent No.: US 8,122,996 B2
(45) Date of Patent: Feb. 28, 2012

(54) DIAPHRAGM FOR SPEAKER, FRAME FOR SPEAKER, DUST CAP FOR SPEAKER, SPEAKER AND APPARATUS USING THEM, AND METHOD FOR MANUFACTURING COMPONENT FOR SPEAKER

(75) Inventors: Yoshimichi Kajihara, Osaka (JP); Shinya Mizone, Mie (JP); Kazuyoshi Mimura, Mie (JP); Takashi Sabato, Mie (JP); Kazuaki Nishimura, Mie (JP)

(73) Assignee: Panasonic Corporation, Osaka (JP)

( * ) Notice: Subject to any disclaimer, the term of this patent is extended or adjusted under 35 U.S.C. 154(b) by 53 days.

(21) Appl. No.: 12/515,622

(22) PCT Filed: Dec. 20, 2007

(86) PCT No.: PCT/JP2007/074497
§ 371 (c)(1), (2), (4) Date: May 20, 2009

(87) PCT Pub. No.: WO2008/084641
PCT Pub. Date: Jul. 17, 2008

(65) Prior Publication Data

US 2010/0059309 A1 Mar. 11, 2010

(30) Foreign Application Priority Data

Dec. 22, 2006 (JP) ................................. 2006-345487
Dec. 22, 2006 (JP) ................................. 2006-345488
Dec. 26, 2006 (JP) ................................. 2006-349171
Feb. 6, 2007 (JP) ................................. 2007-026728

(51) Int. Cl.
*B29C 45/00* (2006.01)
*B29C 47/00* (2006.01)
*H04R 1/00* (2006.01)
*H04R 7/00* (2006.01)
*H04R 9/06* (2006.01)
*H04R 11/02* (2006.01)

(52) U.S. Cl. ........ 181/169; 181/167; 181/168; 181/170; 264/328.1; 381/396; 381/398; 381/421; 381/428; 524/13

(58) Field of Classification Search .................. 181/169; 264/328.1; 381/398; 524/13; 523/223
See application file for complete search history.

(56) References Cited

U.S. PATENT DOCUMENTS 4,505,499 A 3/1985 Uglow et al.
(Continued)

FOREIGN PATENT DOCUMENTS

EP 1781064 A1 * 5/2007
(Continued)

OTHER PUBLICATIONS

International Search Report for Application No. PCT/JP2007/074497, Apr. 15, 2008, Panasonic Corporation.

(Continued)

*Primary Examiner* — Elvin G Enad
*Assistant Examiner* — Christina Russell
(74) *Attorney, Agent, or Firm* — RatnerPrestia

(57) ABSTRACT

A speaker diaphragm is configured by a compound mixed with resin and bamboo fiber. The diaphragm satisfying the advantage of the bamboo fiber of high sound quality and a large degree of freedom in the setting of the characteristic value of the diaphragm and the advantage of the diaphragm made of a resin with improved humidity resistance reliability and strength, excellent external appearance, and enhanced productivity and dimension stability is obtained.

17 Claims, 10 Drawing Sheets

U.S. PATENT DOCUMENTS

| | | | | | |
|---|---|---|---|---|---|
| 5,072,806 | A | * | 12/1991 | Odajima | 181/170 |
| 5,080,743 | A | * | 1/1992 | Odajima | 156/243 |
| 5,152,938 | A | * | 10/1992 | Suda | 264/29.1 |
| 5,274,199 | A | * | 12/1993 | Uryu et al. | 181/169 |
| 6,059,926 | A | * | 5/2000 | Hiroshima | 162/21 |
| 6,103,790 | A | | 8/2000 | Cavaille et al. | |
| 6,794,461 | B2 | * | 9/2004 | Fujita et al. | 525/330.4 |
| 2003/0024763 | A1 | * | 2/2003 | Hachiya et al. | 181/169 |
| 2004/0213346 | A1 | | 10/2004 | Matsumura et al. | |
| 2005/0211402 | A1 | * | 9/2005 | Uryu et al. | 162/138 |
| 2006/0269095 | A1 | * | 11/2006 | Matsumura et al. | 381/421 |
| 2007/0023423 | A1 | * | 2/2007 | Suzuki et al. | 219/633 |
| 2007/0131478 | A1 | * | 6/2007 | Okazaki et al. | 181/167 |
| 2008/0027158 | A1 | * | 1/2008 | Ishida et al. | 523/223 |
| 2009/0028373 | A1 | * | 1/2009 | Mimura et al. | 381/396 |
| 2009/0080687 | A1 | * | 3/2009 | Mimura et al. | 381/428 |
| 2010/0172533 | A1 | * | 7/2010 | Kajihara et al. | 381/398 |

FOREIGN PATENT DOCUMENTS

| | | | |
|---|---|---|---|
| JP | 59-176995 | A | 10/1984 |
| JP | 01-248900 | A | 10/1989 |
| JP | 03-289298 | A | 12/1991 |
| JP | 4-23597 | A | 1/1992 |
| JP | 5-211696 | A | 8/1993 |
| JP | 06-066196 | U | 9/1994 |
| JP | 07-329245 | A | 12/1995 |
| JP | 3055712 | A | 4/2000 |
| JP | 9-509694 | A | 8/2000 |
| JP | 2000-324591 | A | 11/2000 |
| JP | 2001-335710 | A | 12/2001 |
| JP | 2003-012936 | A | 1/2003 |
| JP | 2003-037891 | A | 2/2003 |
| JP | 2003-253011 | A | 9/2003 |
| JP | 2003-253011 | A | 9/2003 |
| JP | 2004-114436 | A | 4/2004 |
| JP | 2004-328150 | A | 11/2004 |
| JP | 2004-357130 | A | 12/2004 |
| JP | 2004-357130 | A | 12/2004 |
| JP | 2005-42283 | A | 2/2005 |
| JP | 2005-206813 | A | 8/2005 |
| JP | 2005-236497 | A | 9/2005 |
| JP | 2005-236497 | A | 9/2005 |
| JP | 2005-236498 | A | 9/2005 |
| JP | 2005-252775 | A | 9/2005 |
| JP | 2005-269427 | A | 9/2005 |
| JP | 2006-272696 | A | 10/2006 |
| JP | 2006-325189 | A | 11/2006 |
| WO | WO 2005/003450 | A1 | 1/2005 |
| WO | WO 2005/079110 | A1 | 8/2005 |
| WO | WO 2006/114979 | A1 | 11/2006 |

OTHER PUBLICATIONS

JP Office Action for 2006-345487, Feb. 8, 2011.
JP Office Action for 2006-345488, Feb. 8, 2011.
JP Office Action for 2007-026728, Feb. 8, 2011.
JP Office Action for 2006-349171, Feb. 8, 2011.
JP Office Action for 2006-345487, Apr. 5, 2011.
JP Office Action for 2006-345488, Apr. 5, 2011.
JP Office Action for 2006-349171, Apr. 5, 2011.

* cited by examiner

DIAPHRAGM FOR SPEAKER, FRAME FOR SPEAKER, DUST CAP FOR SPEAKER, SPEAKER AND APPARATUS USING THEM, AND METHOD FOR MANUFACTURING COMPONENT FOR SPEAKER

This Application is a U.S. National Phase Application of PCT International Application PCT/JP2007/074497, filed Dec. 20, 2007.

TECHNICAL FIELD

The present invention relates to a speaker diaphragm, a speaker frame, and a speaker dust cap used in various acoustic equipments or in video equipments; a speaker, a stereo system, or a television set as well as a device such as a moving body using the same; and a method for manufacturing a speaker component.

BACKGROUND ART

A speaker of the related art will be described below with reference to FIG. 14. FIG. 14 is a cross-sectional view of a speaker of the related art.

As shown in FIG. 14, speaker 110 includes speaker diaphragm 101 (hereinafter referred to as diaphragm 101), magnetic circuit 105, speaker frame 107 (hereinafter referred to as frame 107), and voice coil 108. Magnetic circuit 105 is configured by sandwiching polarized magnet 102 between upper plate 103 and yoke 104. Frame 107 is coupled to yoke 104. An outer periphery of diaphragm 101 is coupled to an outer peripheral portion of frame 107 by way of edge 109. One end of voice coil 108 is coupled to a central portion of diaphragm 101. The other end of voice coil 108 is arranged to fit into magnetic gap 106 formed by magnetic circuit 105. Speaker dust cap 111 (hereinafter referred to as cap 111) is coupled to a front surface portion of diaphragm 101. Voice coil 108 includes tubular voice coil body 108*a*, and has a structure in which coil 108*b* is wounded around an outer peripheral portion of voice coil body 108*a*. An inner periphery of damper 112 is coupled to voice coil 108, and an outer periphery of damper 112 is coupled to frame 107. Speaker 110 is configured in such manner.

Diaphragm 101 is made of resin such as polypropylene (hereinafter referred to as PP), and is formed by injection molding a thermally fused resin pellet into a molding die set with a shape of diaphragm 101. A single material such as PP is generally used for the type of a resin material used in injection molding.

Blend-type diaphragm 101 using different types of resin also exists for the purpose of adjusting characteristic value for diaphragm 101, that is, adjusting characteristics or sound quality for speaker 110. Furthermore, in adjusting the characteristic value where adjustment is difficult only with a resin, adjustment of the characteristic value of diaphragm 101 and adjustment of the characteristics for speaker 110 or sound quality are carried out by mixing a reinforcing material such as mica. Moreover, in order to increase a degree of freedom in adjusting the characteristic value, the sound quality adjustment of diaphragm 101 is carried out by mixing a pulp material. Such speaker 110 of the related art is disclosed in, for example, patent document 1 and patent document 2.

The single material such as PP is also generally used for cap 111 used in speaker 110, similar to diaphragm 101. Speaker 110 of the related art using cap 111 is disclosed in, for example, patent document 3.

Such diaphragm 101 of the related art uses a manufacturing method by papermaking, or a manufacturing method by injection molding or pressing of a resin. Thus, diaphragm 101 of the related art is made of paper or is made of a resin.

Therefore, diaphragm 101 uses different materials depending on the application while exploiting the features of each material. However, each has problems, and it is difficult to satisfy the market demand such as lower distortion, wider band, and higher dynamic range. Furthermore, in the production of diaphragm 101 made of paper, lowering the cost of the component is difficult as great number of steps of papermaking is required. In diaphragm 101 made of a resin, on the other hand, only the standardized characteristic value specific to the resin or the material can be obtained. Thus, the adjustment range of the characteristics and the sound quality for speaker 110 is very narrow.

Diaphragm 101 in which the resin and the pulp material are mixed has a large degree of freedom in the sound quality adjustment, and moisture resistance reliability is also improved. However, diaphragm 101 of the related art has a problem in that the strength is insufficient to enhance the sound quality.

Cap 111 used in speaker 110 also is made of the material and the manufacturing method of cap 111 is similar to diaphragm 101. Therefore, cap 111 has the same problems as diaphragm 101 of the related art.

Frame 107 is desired to have high rigidity, a damping effect, and high internal loss so that the vibration of diaphragm 101 does not transmit to magnetic circuit 105 or resonance is less likely to occur. Frame 107 of the related art thus mainly is made of an iron plate, a material of an aluminum die-cast, or a resin.

However, frame 107 made of the iron plate has problems in that magnetic leakage is large, and the external appearance also lacks in sophisticated image. Frame 107 made of the material of aluminum die-cast excels in magnetic leakage and external appearance quality, and has high rigidity. However, frame 107 made of the material of aluminum die-cast has a problem in that it is very expensive. In order to solve such problems, a thermoplastic synthetic resin is often being injection molded to be molded to the shape of frame 107 and used in recent years. In particular, frame 107 made of the resin has a large degree of freedom in a shape, and is suited for a lighter weight. Speaker 110 using such frame 107 is disclosed in, for example, patent document 4.

However, such frame 107 made of the resin of the related art may be light weight, but does not have enough rigidity with only the resin of a base material. Thus, an inorganic filler such as a glass fiber or mica is often added. In particular, from the aspects of lighter weight, moldability, acoustic performance, and the like, PP having a small specific gravity and large internal loss is used for the resin of frame 107. The addition of the inorganic filler of greater than or equal to 30% by weight is required to satisfy the acoustic performance of frame 107. The rigidity of frame 107 becomes higher by adding the inorganic filler. However, the specific gravity of frame 107 also increases, and thus the weight of frame 107 becomes heavy. Moreover, a problem in that the effect of absorbing unnecessary vibration reduces arises since the internal loss of frame 107 becomes small.

A method for manufacturing diaphragm 101 of the related art will now be described with reference to FIG. 15. FIG. 15 is a process chart showing the method of manufacturing speaker diaphragm 101 made of a resin using injection molding of the related art.

As shown in FIG. 15, resin 114 such as PP is dry blended with PP 115 with a reinforcing material such as mica to produce master batch 116. Master batch 116 is then pelletized to produce master batch pellet 117 (hereinafter referred to as pellet 117). Pellet 117 is then injected in an injection molding machine to thereby manufacturing a speaker component such as diaphragm 101.

In the injection molding machine, injected pellet 117 is heated and melted through a heating step. It is then injected into molding die 118 for diaphragm 101 using an extruder. The injected PP resin is cooled and solidified, and then taken out from the molding die 108, thereby forming diaphragm 101. Diaphragm 101 made of a resin typified by PP and the like is manufactured using such an injection molding step.

A single material such as PP is generally used for the type of resin material used in injection molding. In addition to the PP, blend-type diaphragm 101 in which different types of resins are mixed also exists for the purpose of adjusting a characteristic value for diaphragm 101, that is, adjusting characteristics and sound quality for speaker 110.

A method for manufacturing blend-type diaphragm 101 includes grinding a plurality of types of resin pellets to be mixed using a grinder, where a blending ratio is set. Mixing is performed by dry blending, which is then used to manufacture diaphragm 101.

Such a method for manufacturing speaker 110 of related art is disclosed in, for example, patent document 5.

In order to respond to the market demand on the speaker component such as diaphragm 101, in particular, from the standpoints of quality stabilization and water resistance reliability, and furthermore, diversification of design, diaphragm 101 made of a resin is very popular.

However, in the method for manufacturing the speaker component such as diaphragm 101 of the related art, diaphragm 101 made of a resin has a problem in that adjustment of the characteristics and the sound quality for speaker 110 can only be carried out within a range of the characteristic value of the material of the resin being used, and only a standardized sound can be generated.

[Patent document 1] Unexamined Japanese Patent Publication No. S59-176995

[Patent document 2] Unexamined Japanese Patent Publication No. 2005-236497

[Patent document 3] Unexamined Japanese Patent Publication No. H03-289298

[Patent document 4] Unexamined Japanese Patent Publication No. 2003-37891

[Patent document 5] Unexamined Japanese Patent Publication No. H01-248900

DISCLOSURE OF THE INVENTION

The speaker diaphragm of the present invention is resolved with lack of strength, and provides a speaker in which the adjustment range of the characteristics and the sound quality of the speaker is wide when used in the speaker.

The speaker diaphragm of the present invention includes a resin and a cellulose fiber, where the cellulose fiber is a bamboo fiber. According to such configuration, the speaker diaphragm of high productivity having high strength and high elastic modulus is obtained.

The speaker frame of the present invention is resolved with lack of strength, and provides a speaker having a wide adjustment range of speaker characteristics and sound quality when used in speakers.

The speaker frame of the present invention includes a resin and a cellulose fiber, where the cellulose fiber is a bamboo fiber. According to such configuration, the speaker frame of high productivity having high strength and high elastic modulus is obtained.

The speaker dust cap of the present invention is resolved with lack of strength, and provides a speaker having a wide adjustment range of speaker characteristics and sound quality when used in speakers.

The speaker dust cap of the present invention includes a resin and a cellulose fiber, where the cellulose fiber is a bamboo fiber. According to such configuration, the speaker dust cap of high productivity having high strength and a high elastic modulus is obtained.

A method for manufacturing a speaker component of the present invention includes a miniaturization step, a compounding step, and a molding step, and in the miniaturization step, the fiber is partially miniaturized to the microfibrillated state to generate a microfibrillated fiber containing moisture; in the compounding step, the moisture contained in the microfibrillated fiber and the granulated resin are substituted to generate a compound containing the microfibrillated fiber and the resin; and in the molding step, the compound is injection-molded. According to such manufacturing method, the secondary aggregation of the resin and the fiber is prevented, and the speaker component with enhanced dispersibility is obtained. Furthermore, a speaker with excellent external appearance in which the degree of freedom in the adjustment of sound quality is large, and the humidity resistance and water resistance reliabilities are improved is provided by using the obtained speaker component.

Figure 1:
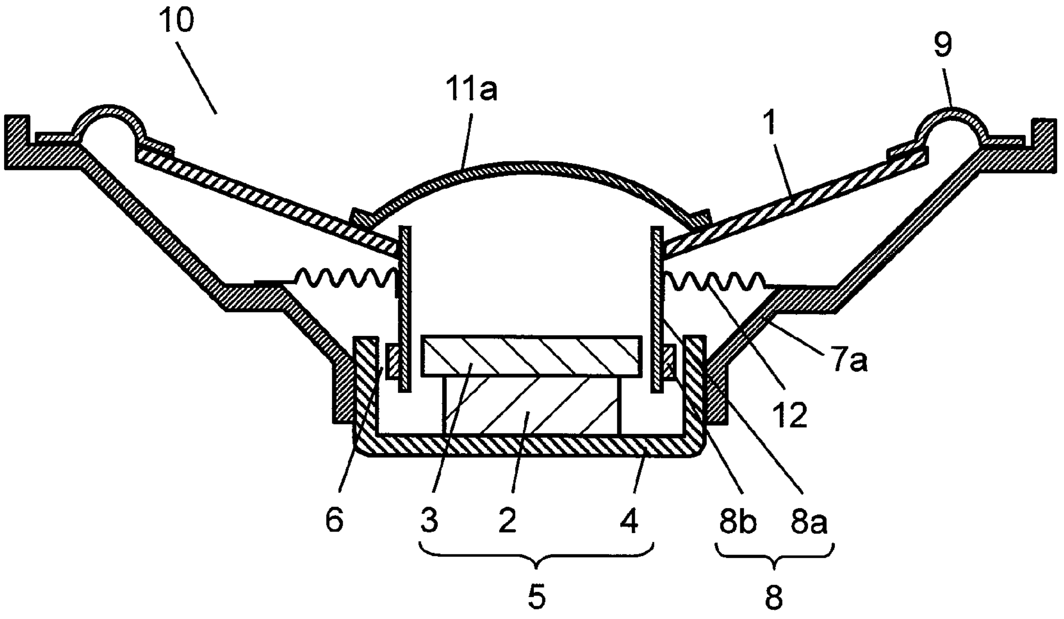
FIG. 1 is a cross-sectional view of a speaker according to Embodiment 1 of the present invention.

| REFERENCE MARKS IN THE DRAWINGS | |
|---|---|
| 1, 1a | speaker diaphragm |
| 2 | magnet |
| 3 | upper plate |
| 4 | yoke |
| 5 | magnetic circuit |
| 6 | magnetic gap |
| 7, 7a | speaker frame |
| 8 | voice coil |
| 8a | voice coil body |
| 8b | coil |
| 9 | edge |
| 10, 10a, 10b | speaker |
| 11, 11a | speaker dust cap |
| 15 | compound |
| 16 | resin |
| 17 | bamboo fiber |
| 18 | microfibrillated bamboo fiber |
| 19 | bamboo powder |
| 20 | bamboo charcoal |
| 21 | speaker system |
| 22 | enclosure |
| 23 | amplifier |
| 24 | amplifier circuit |
| 25 | operation unit |
| 26 | mini-component system |
| 27 | main body |
| 50 | automobile |
| 51 | rear tray |
| 52 | front panel |
| 53 | drive unit |
| 54 | steering |
| 55 | body |
| 56 | front wheel |
| 57 | rear wheel |
| 58 | seat |
| 59 | machine room |
| 61 | polypropylene pellet |
| 62 | granulated polypropylene resin |
| 63 | fiber |
| 64 | microfibrillated fiber |
| 65 | compatibilizing agent |
| 67 | microfibrillated fiber compound pellet |
| 68 | reinforcing material |
| 69 | dilution resin |
| 70 | fluidity modifier |
| 71 | coloring agent |
| 72 | molding die |

PREFERRED EMBODIMENTS FOR CARRYING OUT OF THE INVENTION

Embodiments of the present invention will be hereinafter described using the drawings.

Embodiment 1

Figure 2:
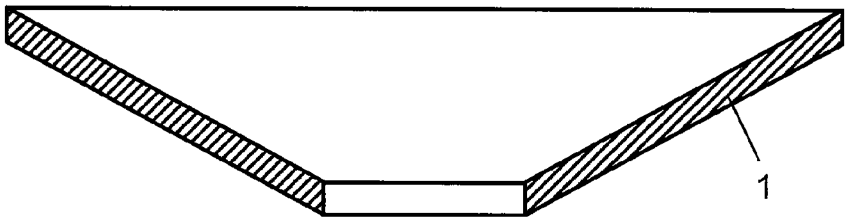
FIG. 2 is a cross-sectional view of a speaker diaphragm used in the speaker shown in FIG. 1
Figure 3:
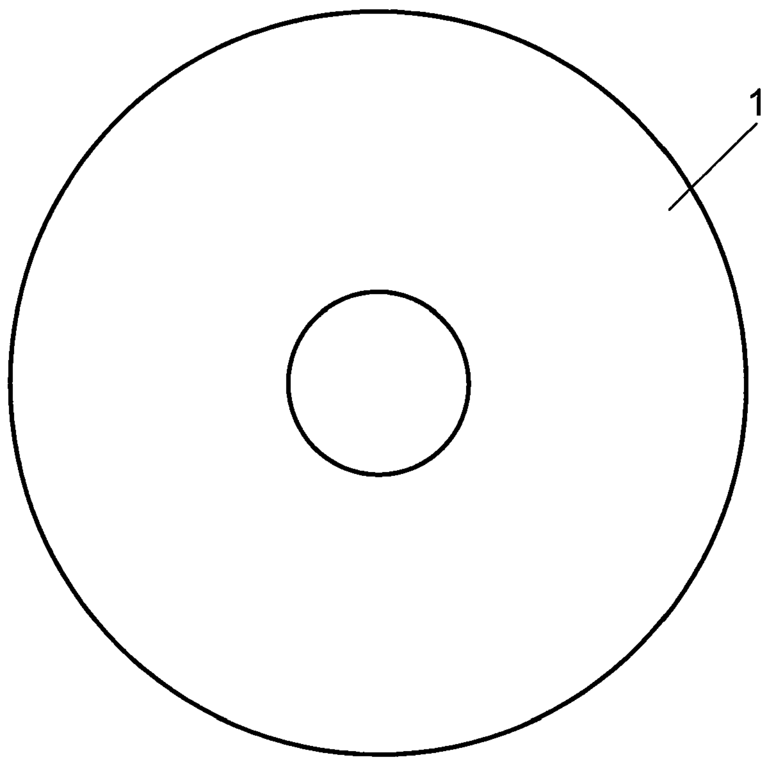
FIG. 3 is a plan view of the speaker diaphragm shown in FIG. 2.
Figure 4A:
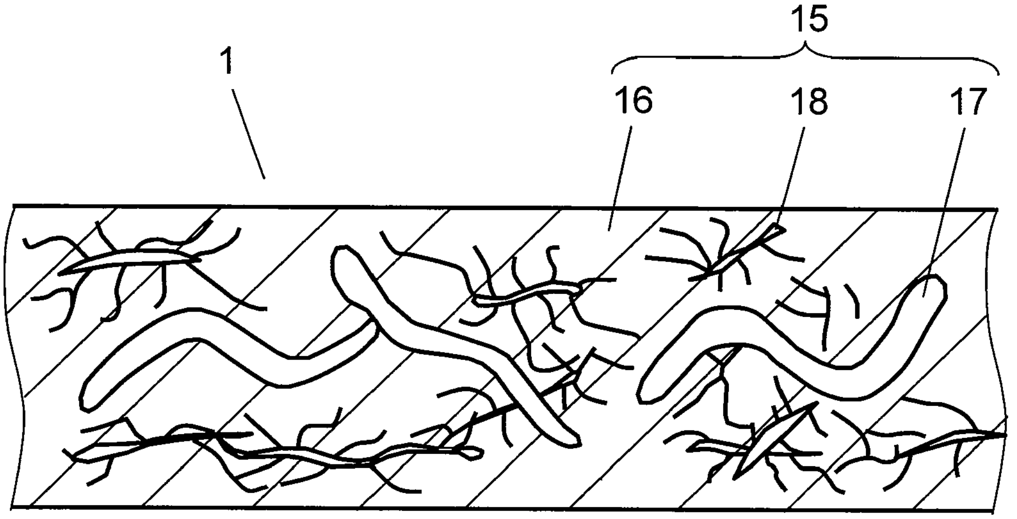
FIG. 4A is a partially detailed cross-sectional view of the speaker diaphragm shown in FIG. 2.
Figure 4B:
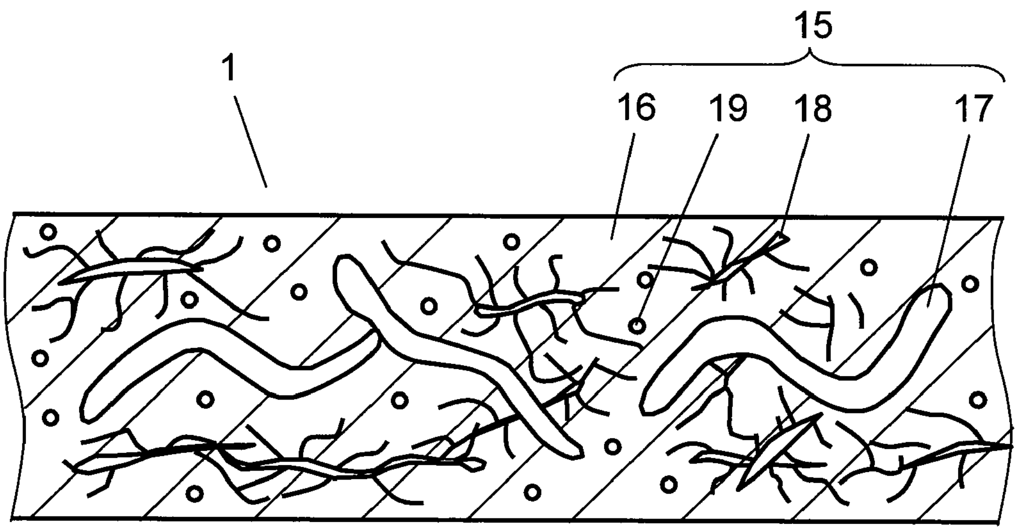
FIG. 4B is a partially detailed cross-sectional view of a speaker diaphragm of another mode used in the speaker shown in FIG. 1.

Embodiment 1 of the present invention will be described with reference to FIG. 1 to FIG. 4. FIG. 1 is a cross-sectional view of speaker 10 according to Embodiment 1 of the present invention. FIG. 2 is a cross-sectional view of speaker diaphragm 1 (hereinafter referred to as diaphragm 1) used in speaker 10 shown in FIG. 1. FIG. 3 is a plan view of diaphragm 1 shown in FIG. 2. FIG. 4A is a partially detailed cross-sectional view of diaphragm 1 shown in FIG. 2. FIG. 4B is a partially detailed cross sectional view of speaker diaphragm 1 of another aspect used in speaker 10 shown in FIG. 1.

As shown in FIG. 1, speaker 10 includes diaphragm 1, magnetic circuit 5, speaker frame 7*a* (hereinafter referred to as frame 7*a*), and voice coil 8. Magnetic circuit 5 is configured by sandwiching polarized magnet 2 between upper plate 3 and yoke 4. Frame 7*a* is coupled to yoke 4. An outer periphery of diaphragm 1 is coupled to an outer peripheral portion of frame 7*a* by way of edge 9. One end of voice coil 8 is coupled to a central portion of diaphragm 1. Another end of voice coil 8 is arranged to fit into magnetic gap 6 formed by magnetic circuit 5. Speaker dust cap 11*a* (hereinafter referred to as cap 11*a*) is coupled to a front surface portion of diaphragm 1. Voice coil 8 includes tubular voice coil body 8*a*, and has a structure in which coil 8*b* is wounded around an outer peripheral portion of voice coil body 8*a*. An inner periphery of damper 12 is coupled to voice coil 8, and an outer periphery of damper 12 is coupled to frame 7*a*. Speaker 10 is configured in this manner.

As shown in FIG. 4A, diaphragm 1 is formed from compound 15 in which resin 16 and bamboo fiber 17, which is a cellulose fiber, are mixed. Diaphragm 1 is preferably formed by injection molding compound 15. Bamboo fiber 17 partially includes microfibrillated bamboo fiber 18 (hereinafter referred to as fiber 18) formed by miniaturizing bamboo fiber 17 to a microfibrillated state. In other words, compound 15 includes resin 16, bamboo fiber 17, and fiber 18.

Diaphragm 1 is formed by mixing bamboo fiber 17 to resin 16, whereby the mechanical rigidity enhances. The rigidity of diaphragm 1 further enhances by including fiber 18. As diaphragm 1 includes bamboo fiber 17 or fiber 18, speaker 10 having lighter weight and larger internal loss is realized as compared to when an inorganic filler is included.

Resin 16 preferably uses a crystalline or non-crystalline olefin resin. Satisfactory moldability of diaphragm 1 is realized by using the olefin resin for resin 16. The crystalline resin and/or the non-crystalline resin are used depending on the application of resin 16. Thus, resin 16 satisfies an optimum characteristic value for a resin material.

Polypropylene (hereinafter referred to as PP) is used for resin 16. The PP is generally easily available, and is easily injection molded. Furthermore, diaphragm 1 having large internal loss is obtained by using PP for resin 16. However, a material selected for resin 16 is not limited to PP. The material selected for resin 16 may be appropriately selected such that a desired characteristic value for diaphragm 1 is obtained.

An engineering plastic may be used for resin 16, not limited to PP. Diaphragm 1 excellent in heat resistance or solvent resistance is obtained by using the engineering plastic for resin 16. Examples of the engineering plastic used in resin 16 include polyacetal (POM: polyoxymethylene), polyamide (PA), polycarbonate (PC) and polybutyleneterephthalate (PBT).

In view of environmental consideration, resin 16 may use a biodegradable plastic typified by polylactic acid (PLA). Environment-friendly diaphragm 1 of high performance that does not require a special disposal method and that avoids extra discharge of carbon dioxide in disposal is obtained by using a biodegradable plastic for resin 16. Other than polylactic acid, the biodegradable plastic may be polycaprolactam, a modified polyvinyl alcohol (modified PVA), casein plastics, and the like. The polylactic acid excels in transparency and rigidity as compared to other biodegradable plastics. The polylactic acid also has satisfactory compatibility with the cellulose of bamboo fiber 17, and thus easily fixes on the surface of bamboo fiber 17. Thus, environment-friendly diaphragm 1 of high rigidity in which the external appearance color of bamboo fiber 17 is not affected is obtained by using polylactic acid for resin 16.

Bamboo fiber 17 used in diaphragm 1 is not particularly limited as long as it is a plant of the bamboo family. Bamboo fiber 17 is preferably a bamboo grown to a bamboo age of one or older, excluding bamboo sprout of less than a bamboo age of one year or child bamboo. The enhancement in rigidity and the enhancement in toughness of diaphragm 1 are ensured by using the bamboo having a bamboo age of one or older for bamboo fiber 17. Bamboo fiber 17 mixed in resin 16 is preferably a bamboo having a bamboo age of four years or older and seven years or younger as the physicality also stabilizes.

Diaphragm 1 that reproduces natural and light tone is obtained by using bamboo fiber 17 in diaphragm 1. Thus, a dark and standardized tone is suppressed as compared to a speaker diaphragm formed only with resin 16. Furthermore, diaphragm 1 having a high elastic modulus as compared to a speaker diaphragm including other pulp material is obtained. Thus, the degree of freedom for adjusting the characteristics of diaphragm 1 increases.

The entanglement between bamboo fibers 17 becomes stronger by mixing microfibrillated bamboo fiber 18 miniaturized to the microfibrillated state in diaphragm 1. As a result, diaphragm 1 having large strength and elastic modulus is obtained. The degree of freedom in adjusting the sound quality for the speaker diaphragm also increases.

The fiber length of fiber 18 mixed in diaphragm 1 is preferably greater than or equal to 0.2 mm and smaller than or equal to 3 mm. The effect of heating granulation when obtaining compound 15 mixed with resin 16 and bamboo fiber 17 is efficiently produced by including fiber 18 having a fiber length in a range of greater than or equal to 0.2 mm and smaller than or equal to 3 mm for diaphragm 1. The productivity and the quality of diaphragm 1 also enhance.

If the fiber length of fiber 18 is shorter than 0.2 mm, the effect of fiber 18 is not efficiently produced, and diaphragm 1 having high elastic modulus is hardly obtained. If, on the other hand, the fiber length of fiber 18 is longer than 3 mm, secondary aggregation that occurs from the entanglement between fibers 18 easily occur, and dispersion failure of fiber 18 easily occurs. Thus, a long time is required for the kneading of resin 16 and bamboo fiber 17. An aggregate of fiber 18 may appear on the surface of diaphragm 1, thereby affecting the external appearance of speaker 10. Therefore, the productivity and the quality of diaphragm 1 enhance if the fiber length of fiber 18 to be mixed in diaphragm 1 is within a range of greater than or equal to 0.2 mm and smaller than or equal to 3 mm.

The average fiber diameter of fiber 18 to be mixed in diaphragm 1 is preferably smaller than or equal to 10 μm. A typical fiber has higher elasticity the larger the aspect ratio (fiber length/fiber diameter=L/D), which is the ratio of the fiber length L and the fiber diameter D. Therefore, microfibrillated bamboo fiber 18 miniaturized to the microfibrillated state having a relatively large aspect ratio, and high elastic modulus can be expected. The entanglement between the fibers is not strong if the average fiber diameter of fiber 18 is greater than 10 μm. Furthermore, the bonding between resin 16 and bamboo fiber 17, or between bamboo fiber 17 and bamboo fiber 17 becomes strong if fiber 18 partially exists at a part of bamboo fiber 17. Therefore, the synergistic effect of a higher elastic modulus of a single body of bamboo fiber 17 and enhanced bonding strength between the fibers is obtained if the average fiber diameter of fiber 18 to be mixed in diaphragm 1 is smaller than to equal to 10 μm, and diaphragm 1 having a higher elastic modulus is obtained.

If bamboo fiber 17 is contained in compound 15 in a great amount, bamboo powder 19 may be used for a part of or all of bamboo fiber 17 to expect a more natural and lighter tone. As shown in FIG. 4B, the lowering of fluidity when forming diaphragm 1 through injection molding is suppressed by using bamboo powder 19 in diaphragm 1. The moldability of diaphragm 1 thereby improves. The shape of bamboo powder 19 may not be a fibrous shape having an aspect ratio, and is preferably a granulated shape obtained by grinding bamboo fiber 17.

Figure 4C:
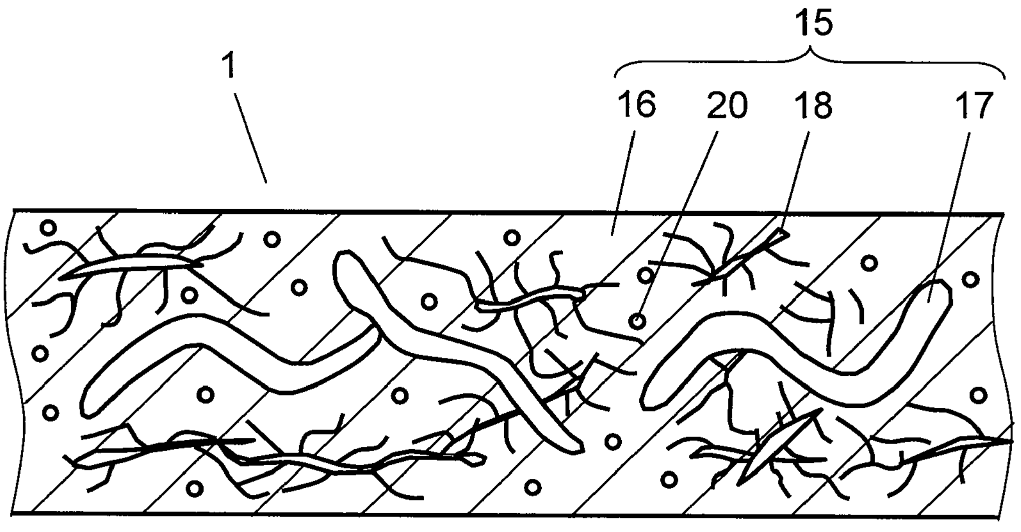
FIG. 4C is a partially detailed cross-sectional view of a speaker diaphragm of another furthermore mode used in the speaker shown in FIG. 1.

As shown in FIG. 4C, bamboo powder 19 having a granulated shape is more preferably bamboo charcoal 20, which is obtained by carbonizing bamboo powder 19. Bamboo charcoal 20 generated by carbonizing bamboo powder 19 at a temperature of higher than or equal to 600° C. is preferably used in diaphragm 1. Diaphragm 1 then has characteristics of higher elastic modulus and higher internal loss. If diaphragm 1 is colored by adding a pigment to diaphragm 1, the elastic modulus of diaphragm 1 tends to lower. However, by mixing bamboo charcoal 20 in diaphragm 1, diaphragm 1 is colored and furthermore elastic modulus of diaphragm 1 is enhanced. As a result, diaphragm 1 mixed with bamboo charcoal 20 has a high quality external appearance. Since the raw material of bamboo charcoal 20 is bamboo as opposed to a typical coloring agent such as a pigment, diaphragm 1 can reproduce a natural and light sound.

The mixing ratio of bamboo fiber 17 with respect to resin 16 used in diaphragm 1 is preferably greater than or equal to 5% by weight and smaller than or equal to 60% by weight. If the blending ratio of resin 16 and bamboo fiber 17 is in a range of greater than or equal to 5% by weight and smaller than or equal to 60% by weight, the kneading effect when resin 16 and bamboo fiber 17 are kneaded can be efficiently produced. Furthermore, the productivity and the quality of diaphragm 1 are improved.

If the mixing ratio of bamboo fiber 17 is less than 5% by weight, the effect of using bamboo fiber 17 is barely produced. If the mixing ratio of bamboo fiber 17 is greater than 60% by weight, a long time is required for the kneading of resin 16 and bamboo fiber 17. Furthermore, since molding of diaphragm 1 using injection molding becomes difficult, the productivity and dimension stability lower, and the degree of freedom in the shape of diaphragm 1 decreases.

Bamboo fiber 17 of greater than or equal to 60% by weight can be mixed in diaphragm 1 by using bamboo powder 19 or bamboo charcoal 20 for bamboo fiber 17. In other words, when bamboo powder 19 or bamboo charcoal 20 is used for bamboo fiber 17, the mixing ratio of bamboo fiber 17 with respect to resin 16 is preferably greater than or equal to 5% by weight and smaller than or equal to 70% by weight. Effects such as enhancement of fluidity at the time of kneading resin 16 and bamboo fiber 17 are efficiently produced by using bamboo powder 19 or bamboo charcoal 20 for bamboo fiber 17. The enhancement in productivity and the enhancement in quality of diaphragm 1 are thereby realized. Bamboo powder 19 or bamboo charcoal 20 excels in dispersibility compared to bamboo fiber 17. Bamboo fiber 17 up to 70% by weight thus can be uniformly dispersed. Therefore, bamboo fiber 17 with a high concentration is uniformly dispersed. Accordingly, diaphragm 1 having excellent external appearance is obtained.

Moreover, when reinforcing diaphragm 1, when giving a slight accent to the reproduction sound of speaker 10, when performing sound quality adjustment by providing a peak to the sound pressure frequency characteristics, and the like, reinforcing material 68 may be mixed in compound 15. As reinforcing material 68, for example, mica, graphite, talc, calcium carbonate, clay, carbon fiber, aramid fiber, and the like are used.

When mica is used for reinforcing material 68, the elastic modulus of diaphragm 1 becomes higher. When graphite is used for reinforcing material 68, enhancement of the elastic modulus and enhancement of the internal loss of diaphragm 1 are realized. When talc, calcium carbonate, or clay is used for reinforcing material 68, the internal loss of diaphragm 1 enhances.

A tough fiber such as carbon fiber may be used for reinforcing material 68. When carbon fiber is used for reinforcing material 68, the rigidity of diaphragm 1 increases and the elastic modulus enhances.

When aramid fiber is used for reinforcing material 68, bamboo fiber 17 and the aramid fiber entangle in time of heating granulation when generating compound 15. Thus, the elastic modulus does not lower and the internal loss enhances in diaphragm 1. When microfibrillated aramid fiber miniaturized to the microfibrillated state is used for reinforcing material 68, the aspect ratio of the microfibrillated aramid fiber becomes large and the entanglement between the fibers becomes strong. Diaphragm 1 realizing a high elastic modulus and a high internal loss is thereby obtained.

The length of the microfibrillated aramid fiber used for reinforcing material 68 is preferably greater than or equal to 0.2 mm and smaller than or equal to 3 mm. The effect of heating granulation when obtaining compound 15 mixed with resin 16 and bamboo fiber 17 is efficiently produced by including a microfibrillated aramid fiber having a fiber length in a range of greater than or equal to 0.2 mm and smaller than or equal to 3 mm for reinforcing material 68. At the same time, the productivity and the quality of diaphragm 1 are also improved.

If the fiber length of the microfibrillated aramid fiber is shorter than 0.2 mm, the effect of the microfibrillated aramid fiber is not efficiently exerted, and diaphragm 1 having high elastic modulus is hardly obtained. If, on the other hand, the fiber length of the microfibrillated aramid fiber is longer than 3 mm, secondary aggregation that occurs from the entanglement between the microfibrillated aramid fibers easily occur, and dispersion failure of the microfibrillated aramid fiber easily occurs. Thus, a long time is required for kneading when reinforcing material 68 is mixed. An aggregate of the microfibrillated aramid fiber may appear on the surface of diaphragm 1, thereby affecting the external appearance of speaker 10. Therefore, the productivity and the quality of diaphragm 1 enhance if the fiber length of the microfibrillated aramid fiber used for reinforcing material 68 is within a range of greater than or equal to 0.2 mm and smaller than or equal to 3 mm.

The average fiber diameter of the microfibrillated aramid fiber used for reinforcing material 68 is preferably smaller than or equal to 5 μm. A typical fiber has higher elasticity as the aspect ratio is larger. Therefore, the microfibrillated aramid fiber miniaturized to the microfibrillated state of smaller than or equal to 5 μm has a relatively large aspect ratio, and high elastic modulus can be expected. The entanglement between the fibers does not become strong if the average fiber diameter of the microfibrillated aramid fiber is greater than 5 μm. Furthermore, the bonding between resin 16 and bamboo fiber 17, or between bamboo fiber 17 and bamboo fiber 17 becomes strong if the microfibrillated aramid fiber partially exists at a part of the aramid fiber. Therefore, high effect of reinforcing material 68 is obtained if the average fiber diameter of the microfibrillated aramid fiber used as reinforcing material 68 is smaller than to equal to 5 μm, and a higher elastic modulus is expected on diaphragm 1.

Reinforcing material 68 is preferably mixed at greater than or equal to 10% by weight in order for diaphragm 1 to obtain a sufficient elastic modulus. The elastic modulus of diaphragm 1 enhances when the mixing ratio of reinforcing material 68 increases.

Compatibilizing agent 65 may be mixed in compound 15. The compatibility between non-polar resin 16 such as PP and bamboo fiber 17 improves by using compatibilizing agent 65 for compound 15. Thus, the features of bamboo fiber 17 are efficiently produced.

In particular, a hydrolyzable long-chain alkylsilane is preferably used for compatibilizing agent 65. The long-chain alkyl group of the hydrolyzable long-chain alkylsilane is similar to the olefin resin such as PP in terms of structure. Thus, satisfactory compatibility is obtained in resin 16 and compatibilizing agent 65. As a result, the compatibility between bamboo fiber 17 and resin 16 also increases, and the characteristics of diaphragm 1 enhances. Therefore, bamboo fiber 17 and resin 16 such as the olefin resin are strongly bonded by mixing hydrolyzable long-chain alkylsilane in compound 15. Furthermore, hydrolyzable long-chain alkylsilane in which an alkyl group has 6 or more carbon atoms is particularly used. The hydrolyzable long-chain alkylsilane in which an alkyl group has 6 or more carbon atoms has a long carbon chain, and thus resin 16 and bamboo fiber 17 are strongly bonded. Light and high rigid diaphragm 1 exhibiting the characteristics of bamboo fiber 17 is thereby obtained. If the hydrolyzable long-chain alkylsilane is hexytrimethoxysilane or decyltrimethoxysilane, the above actions are more effectively exerted. Compatibilizing agent 65 is not limited to the hydrolyzable long-chain alkylsilane. For instance, a so-called acid modified polypropylene resin modified with silane coupling agent or maleic anhydride and the like, and given polarity may be used for compatibilizing agent 65.

Coloring agent 71 such as a pigment may be mixed in compound 15. The color of diaphragm 1 is adjusted by including coloring agent 71. In particular, so-called green-bamboo-colored diaphragm 1 is obtained by including coloring agent 71 having a green component. Coloring agent 71 to be mixed is preferably an organic phthalocyanine green or a mixture of phthalocyanine blue and titanium yellow.

Such materials are combined and used for the material of compound 15, so that the characteristic value of diaphragm 1 can be freely adjusted at high accuracy. Diaphragm 1 then can have the predetermined characteristics and the sound quality easily adjusted.

In the realization of the predetermined characteristics and the sound quality of diaphragm 1, deep know-how is required for characteristic creation and sound creation of speaker 10. However, in most times, adjustment is generally made through the following methods. In other words, with respect to characteristic creation and sound creation of speaker 10, adjustment of a certain extent can be made by changing the parameters of the components of speaker 10. Thus, speaker 10 approaches the predetermined characteristics and sound quality.

For instance, it is assumed that the parameters of other components other than diaphragm 1 of the components of speaker 10 are constant. The parameter variable by diaphragm 1 includes an area, a shape, a weight, surface thickness, and the like other than the characteristic value of diaphragm 1. However, the area, shape, weight, surface thickness, and the like of diaphragm 1 are more or less determined at the initial stage in designing speaker 10. That is, the sound pressure frequency characteristics and the sound quality of speaker 10 are broadly determined by the conditions other than the characteristic value of diaphragm 1.

In this case, unnecessary peak or dip produces on the sound pressure frequency characteristics of speaker 10, and distortion often produces greatly in a specific frequency band. The sound quality of speaker 10 becomes a tone greatly dependent on the sound pressure frequency characteristics. The cause of obtaining the characteristics of speaker 10 is due to the area, shape, weight, and surface thickness of diaphragm 1. It is often influenced, in particular, by the vibration mode of diaphragm 1. In order to improve such unnecessary peak or dip and the distortion, and produce a satisfactory sound quality, the material of diaphragm 1 is appropriately selected. In this case, the material of diaphragm 1 is selected in the following procedure.

First, the material configuration assumed to satisfy the sound pressure frequency characteristics, the sound quality, and the reliability grade demanded on speaker 10 is selected for resin 16, bamboo fiber 17, and other mixing material thereof. In this case, selection is made especially focusing on the reliability of heat resistance grade and the like with respect to resin 16 that becomes the base. A material in which the unique tone of resin 16 is close to a predetermined tone is selected.

Each material is then selected for the unnecessary peak or the dip on the sound pressure frequency characteristics to delete. In the case of a dip countermeasure, the material of resin 16 having a resonance point in the frequency where the dip produces is selected. Adversely, in the peak countermeasure, the material of resin 16 having internal loss in the frequency where the peak produces is selected. Such material selection is made on resin 16, bamboo fiber 17, and other mixing materials in view of the material specific density, elastic modulus, internal loss, tone, resonance frequency when molded to the shape of diaphragm 1, and the like.

The selected material is then kneaded, and a master batch pellet highly filled with bamboo fiber 17 is fabricated for injection molding. Diaphragm 1 is obtained by injection molding using the master batch pellet.

The characteristic value and the like of diaphragm 1 obtained in the above manner are then measured and evaluated. Speaker 10 is experimentally manufactured using diaphragm 1. Actually, the characteristics and the sound quality of experimentally manufactured speaker 10 are measured and listened to, and the selected material is ultimately evaluated. If the predetermined characteristics and the sound quality are not obtained by evaluation, such an experimental manufacturing process is repeated over and over. Improvement is made on the material selection and the blending ratio of the selected material, and trial and error of material selection and the like is sequentially repeated so as to approach the target characteristics and sound quality.

Diaphragm 1 satisfies the predetermined characteristics and sound quality by repeating the process of trial and error. Diaphragm 1 very close to the predetermined characteristics and sound quality is obtained.

If polylactic acid is used for resin 16, the compatibility between resin 16 and bamboo fiber 17 improves as compared to when PP is used. Furthermore, the compatibility between resin 16 and bamboo fiber 17 further enhances by including tannin and the like for compatibilizing agent 65.

Therefore, in the present invention, compound 15 is made of a material mixed with resin 16 and bamboo fiber 17, which is then injection molded to form speaker diaphragm 1. The degree of freedom in setting the characteristic value of diaphragm 1 thus increases, and in particular, high internal loss and humidity resistance reliability of resin 16 are ensured while exhibiting high elastic modulus, which is the feature of bamboo fiber 17. Diaphragm 1 excellent in external appearance and with enhanced productivity and dimension stability is obtained. Diaphragm 1 has characteristics of high sound quality, large output, and high reliability.

Furthermore, speaker 10 having high productivity excellent in external appearance in which the degree of freedom in adjustment of characteristics and sound quality is large, and humidity resistance reliability and strength are ensured is realized by configuring speaker 10 using diaphragm 1.

Therefore, speaker 10 includes inner magnetic type magnetic circuit 5. However, speaker 10 is not limited to the configuration including inner magnetic type magnetic circuit 5. For instance, speaker 10 may be speaker 10 including outer magnetic type magnetic circuit (not shown).

Embodiment 2

Embodiment 2 of the present invention will be described using the drawings. The configurations similar to Embodiment 1 are denoted with similar reference numerals, and the detailed description will be omitted.

Figure 5:
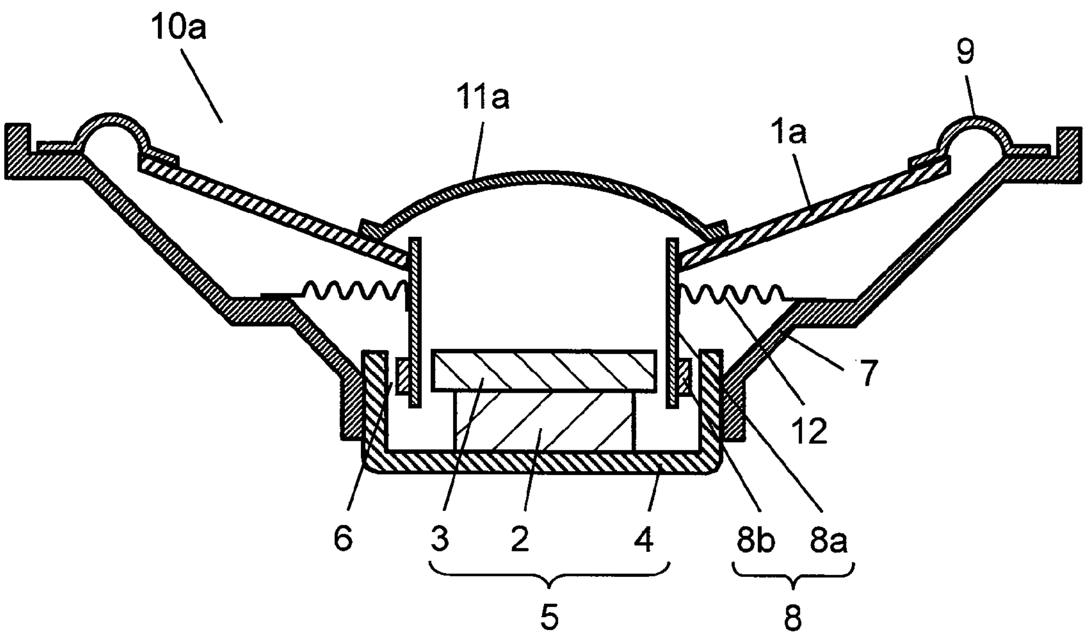
FIG. 5 is a cross-sectional view of a speaker according to Embodiment 2 of the present invention.
Figure 6:
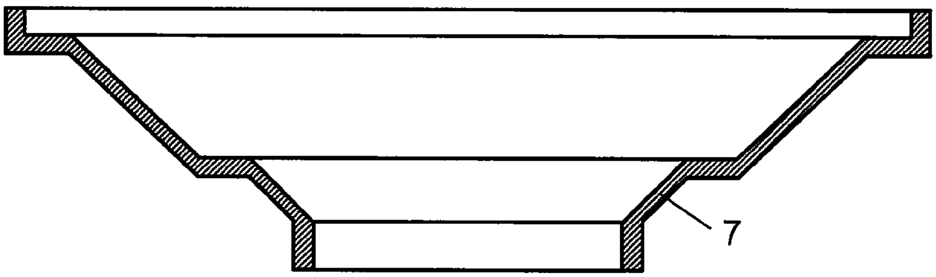
FIG. 6 is a cross-sectional view of a speaker frame used in the speaker shown in FIG. 5.
Figure 7:
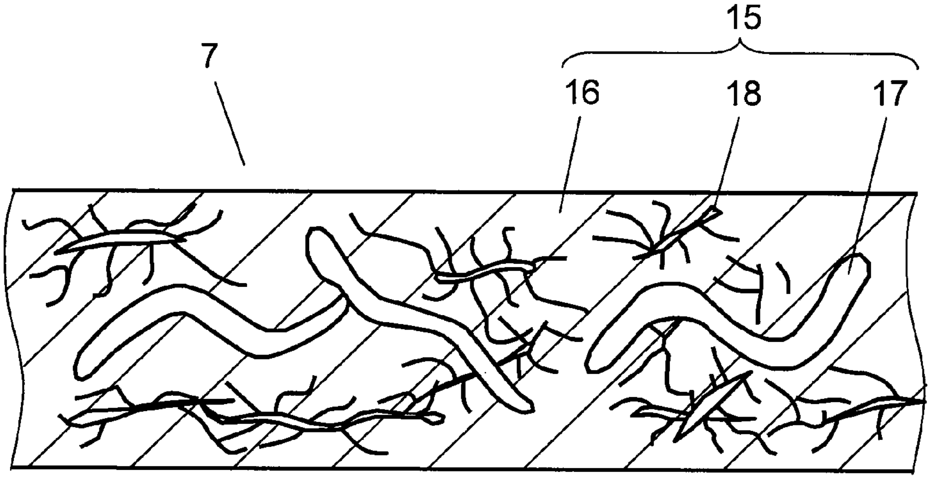
FIG. 7 is a partially detailed cross sectional view of the speaker frame shown in FIG. 6.

FIG. 5 is a cross-sectional view of speaker 10*a* according to Embodiment 2 of the present invention. FIG. 6 is a cross-sectional view of speaker frame 7 (hereinafter referred to as frame 7) used in speaker 10*a* shown in FIG. 5. FIG. 7 is a partially detailed cross sectional view of frame 7 shown in FIG. 6.

As compared to speaker 10 according to Embodiment 1, speaker 10*a* according to Embodiment 2 has diaphragm 1 replaced with speaker diaphragm 1*a* (hereinafter referred to as diaphragm 1*a*), and frame 7*a* replaced with frame 7. Other configurations of speaker 10*a* according to Embodiment 2 have configurations similar to speaker 10 according to Embodiment 1. Diaphragm 1*a* includes resin 16 but does not include bamboo fiber 17. Similar to diaphragm 1, frame 7 is made from compound 15 in which resin 16 and bamboo fiber 17, which is a cellulose fiber, are mixed. The mechanical rigidity of frame 7 enhances by forming frame 7 by mixing bamboo fiber 17 to resin 16. Moreover, the rigidity of frame 7 further enhances by including microfibrillated bamboo fiber 18 miniaturized to the microfibrillated state. As frame 7 includes bamboo fiber 17 or fiber 18, speaker 10*a* having light weight and large internal loss compared to when including the inorganic filler is realized. Frame 7 is preferably formed by injection molding compound 15.

Resin 16 preferably uses a crystalline or non-crystalline olefin resin. Satisfactory moldability of frame 7 is realized by using an olefin resin for resin 16. The crystalline resin and/or the non-crystalline resin are used depending on the application of resin 16. Thus, resin 16 satisfies an optimum characteristic value for a resin material.

Polypropylene (hereinafter referred to as PP) is used for resin 16. The PP is generally easily available, and is easily injection molded. Furthermore, frame 7 having large internal loss is obtained by using PP for resin 16. However, the material selected for resin 16 is not limited to PP. The material selected for resin 16 may be appropriately selected such that a desired characteristic value for frame 7 is obtained.

An engineering plastic may be used for resin 16, not limited to PP. Frame 7 excellent in heat resistance or solvent resistance is obtained by using the engineering plastic for resin 16. The engineering plastic used in resin 16 may be polyacetal, polyamide, polycarbonate and polybutyleneterephthalate.

In view of environmental consideration, resin 16 may use a biodegradable plastic typified by polylactic acid. Environment-friendly frame 7 of high performance that does not require a special disposal method and that avoids extra discharge of carbon dioxide in disposal is obtained by using the biodegradable plastic for resin 16. Other than polylactic acid, as the biodegradable plastic, examples such as polycaprolactam, a modified polyvinyl alcohol, casein plastics, and the like, are used. The polylactic acid excels in transparency and rigidity compared to other biodegradable plastic. The polylactic acid also has satisfactory compatibility with the cellulose of bamboo fiber 17, and thus easily fixes on the surface of bamboo fiber 17. Thus, environment-friendly frame 7 of high rigidity in which the external appearance color of bamboo fiber 17 is not affected is obtained by using polylactic acid for resin 16.

A configuration example of frame 7 when using PP for resin 16 will now be described. First, a pellet in which bamboo fiber 17 or bamboo fiber 17 and reinforcing material 68 are kneaded to resin 16 is fabricated. A plate having a thickness of 0.3 mm is obtained by injection molding using the pellet. After measuring the specific gravity of the obtained plate, a part of the plate is cut out, and a sample having a size of 32 mm×5 mm is obtained. The elastic modulus and the internal loss of the obtained sample are measured, and compared with the characteristics of a plate not containing bamboo fiber 17. The comparison result is shown in table 1.

TABLE 1

| Sample | Bamboo fiber | Reinforcing material: Mica | Reinforcing material: Glass fiber | Specific gravity | Elastic modulus (MPa) | Internal loss |
|---|---|---|---|---|---|---|
| 1 | 0 | 0 | 0 | 0.91 | 1660 | 0.060 |
| 2 | 0 | 25 | 15 | 1.17 | 3500 | 0.040 |
| 3 | 30 | 0 | 0 | 1.04 | 3000 | 0.055 |
| 4 | 40 | 0 | 0 | 1.06 | 4000 | 0.050 |
| 5 | 20 | 10 | 0 | 1.07 | 3500 | 0.055 |

As shown in table 1, the plate containing bamboo fiber has characteristics of low specific gravity, high elastic modulus and high internal loss compared to the plate not containing bamboo fiber 17. In other words, a plate of sample 1 does not contain bamboo fiber 17 and reinforcing material 68. The plate of sample 1 thus has low specific gravity and high internal loss but low elastic modulus. A plate of sample 2 does not contain bamboo fiber 17 but contains reinforcing material 68. The plate of sample 2 thus has high elastic modulus but high specific gravity and low internal loss. As opposed to sample 1 and sample 2, plates of sample 3, sample 4, and sample 5 contain bamboo fiber 17. Thus, the plates of sample 3, sample 4, and sample 5 have characteristics of low specific gravity, high elastic modulus and high internal loss.

Therefore, the plate has extremely effective characteristics by containing bamboo fiber 17. As bamboo fiber 17 has large internal loss, the plate containing bamboo fiber 17 has a high effect of absorbing unnecessary vibration. The elastic modulus enhances compared to the plate configured with simple body of resin 16. The characteristics of the plate of each material configuration shown in table 1 are obtained by measuring the sample having a size of 32 mm×5 mm. However, the characteristic values described in table 1 are also applicable when each material configuration is actually applied to frame 7.

Furthermore, the entanglement between bamboo fibers 17 becomes stronger by mixing microfibrillated bamboo fiber 18 miniaturized to the microfibrillated state to frame 7. As a result, frame 7 of large strength and elastic modulus is obtained.

The fiber length of fiber 18 mixed in frame 7 is preferably greater than or equal to 0.2 mm and smaller than or equal to 3 mm. The effect of heating granulation when obtaining compound 15 mixed with resin 16 and bamboo fiber 17 is efficiently produced by including fiber 18 having a fiber length in a range of greater than or equal to 0.2 mm and smaller than or equal to 3 mm for frame 7. The productivity and the quality of frame 7 also enhance.

If the fiber length of fiber 18 is shorter than 0.2 mm, the effect of fiber 18 is not efficiently produced, and frame 7 of sufficient strength is hardly obtained. If, on the other hand, the fiber length of fiber 18 is longer than 3 mm, secondary aggregation that occurs from the entanglement between fibers 18 easily occur, and dispersion failure of fiber 18 easily occurs. Thus, it is required to take a long time for the kneading of resin 16 and bamboo fiber 17. An aggregate of fiber 18 may appear on the surface of frame 7, thereby external appearance of speaker 10 may be damaged. Therefore, the productivity and the quality of frame 7 enhance if the fiber length of fiber 18 to be mixed in frame 7 is within a range of greater than or equal to 0.2 mm and smaller than or equal to 3 mm.

The fiber diameter of fiber 18 to be mixed in frame 7 is preferably smaller than or equal to 10 μm. The entanglement between the fibers is not strong if the average fiber diameter of fiber 18 is greater than 10 μm. Moreover, high elastic modulus can be expected for the fiber having a large aspect ratio. Therefore, the synergistic effect of higher elastic modulus of single body of bamboo fiber 17 and enhanced bonding strength between the fibers is obtained if the average fiber diameter of fiber 18 to be mixed in frame 7 is smaller than to equal to 10 μm, and frame 7 having higher elastic modulus is obtained.

If bamboo fiber 17 is contained in compound 15 in great amount, bamboo powder 19 or bamboo charcoal 20 may be used for a part of or all of bamboo fiber 17. The lowering of fluidity when frame 7 is formed by injection molding is suppressed even when the content of bamboo becomes high concentration by including bamboo powder 19 or bamboo charcoal 20 in frame 7. Thus, when the bamboo component is contained at the same concentration, the moldability of frame 7 is more improved as compared with forming only by bamboo fiber 17.

The mixing ratio of bamboo fiber 17 with respect to resin 16 is preferably greater than or equal to 15% by weight and smaller than or equal to 60% by weight. If the blending ratio of resin 16 and bamboo fiber 17 is in a range of greater than or equal to 15% by weight and smaller than or equal to 60% by weight, the kneading effect when resin 16 and bamboo fiber 17 are kneaded can be efficiently produced. Furthermore, the productivity and the quality of frame 7 enhance.

If the mixing ratio of bamboo fiber 17 is less than 15% by weight, the features of bamboo fiber 17, high elasticity and high strength, cannot be produced. If the mixing ratio of bamboo fiber 17 is greater than 60% by weight, uniform dispersion of bamboo fiber 17 is difficult. The fluidity of compound 15 also lowers. Thus, as molding of frame 7 using injection molding becomes difficult, the productivity and dimension stability lower, and the degree of freedom in the shape of frame 7 decreases.

Furthermore, bamboo fiber 17 of greater than or equal to 60% by weight can be mixed in frame 7 by using bamboo powder 19 or bamboo charcoal 20 for bamboo fiber 17. In other words, when bamboo powder 19 or bamboo charcoal 20 is used for bamboo fiber 17, the mixing ratio of bamboo fiber 17 with respect to resin 16 is preferably greater than or equal to 15% by weight and smaller than or equal to 70% by weight. Effects such as enhancement of fluidity when kneading resin 16 and bamboo fiber 17 are efficiently produced by using bamboo powder 19 or bamboo charcoal 20 for bamboo fiber 17. The enhancement in productivity and the enhancement in quality of frame 7 are thereby realized. Bamboo powder 19 or bamboo charcoal 20 excels in dispersibility compared to bamboo fiber 17. Bamboo fiber 17 up to 70% by weight thus can be uniformly dispersed. Bamboo fiber 17 with a high concentration is thus uniformly dispersed. Frame 7 having excellent external appearance is thereby obtained.

Further, when the elastic modulus of frame 7 is enhanced, reinforcing material 68 may be mixed in compound 15. Reinforcing material 68 may be either glass fiber or mica, or combination of glass fiber and mica, and the like.

Other than glass fiber and mica, reinforcing material 68 may be inorganic filler or organic fiber. Talc, graphite, glass flake and the like can be used for the inorganic filler. Aramid fiber, carbon fiber, and the like can be used for the organic fiber. Reinforcing material 68 may be a material combining such materials. The microfibrillated aramid fiber obtained by miniaturizing the aramid fiber to the microfibrillated state may be used for reinforcing material 68. The microfibrillated aramid fiber has a large aspect ratio, and the entanglement between the fibers becomes strong. Therefore, frame 7 having high strength and high rigidity is obtained if the microfibrillated aramid fiber is used for reinforcing material 68.

When reinforcing material 68 is mixed in compound 15, the mixing ratio of reinforcing material 68 is preferably greater than or equal to 10% by weight and less than or equal to 25% by weight. Reinforcing material 68 is preferably mixed at greater than or equal to 10% by weight in order for frame 7 to obtain sufficient elastic modulus. The elastic modulus of frame 7 enhances when the mixing ratio of reinforcing material 68 increases. However, the specific gravity of frame 7 tends to become large and the internal loss tends to decrease. Therefore, the mixing ratio of reinforcing material 68 is preferably less than or equal to 25% by weight.

Compatibilizing agent 65 may be mixed in compound 15. The compatibility between non-polar resin 16 such as PP and bamboo fiber 17 improves by using compatibilizing agent 65 for compound 15. Thus, the features of bamboo fiber 17 are efficiently exerted.

In particular, a hydrolyzable long-chain alkylsilane is preferably used for compatibilizing agent 65. The long-chain alkyl group of the hydrolyzable long-chain alkylsilane is similar to the olefin resin such as PP in terms of structure. Thus, satisfactory compatibility is obtained in resin 16 and compatibilizing agent 65. As a result, the compatibility between bamboo fiber 17 and resin 16 also increases, and the characteristics of diaphragm 1 enhances. Therefore, bamboo fiber 17 and resin 16 such as the olefin resin are strongly bonded by mixing hydrolyzable long-chain alkylsilane to compound 15. Furthermore, hydrolyzable long-chain alkylsilane in which an alkyl group has 6 or more carbon atoms is particularly used. The hydrolyzable long-chain alkylsilane in which an alkyl group is six or more carbon atoms has a long carbon chain, and thus resin 16 and bamboo fiber 17 are strongly bonded. Light and high rigid frame 7 exhibiting the characteristics of bamboo fiber 17 is thereby obtained. If the hydrolyzable long-chain alkylsilane is hexytrimethoxysilane or decyltrimethoxysilane, the above actions are more effectively exerted. Compatibilizing agent 65 is not limited to the hydrolyzable long-chain alkylsilane. For instance, a so-called acid modified polypropylene resin modified with silane coupling agent or maleic anhydride and the like, and given polarity may be used for compatibilizing agent 65.

Coloring agent 71 such as a pigment may be mixed in compound 15. The color of frame 7 is adjusted by including coloring agent 71. In particular, so-called bamboo-colored frame 7 is obtained by including coloring agent 71 having a green component. Coloring agent 71 to be mixed is preferably an organic phthalocyanine green or a mixture of phthalocyanine blue and titanium yellow.

Such materials are combined and used for the material of compound 15, so that the characteristic value of frame 7 can be freely adjusted at high accuracy. Predetermined characteristics and sound quality are thus easily adjusted in flame 7.

Therefore, the present invention forms speaker frame 7 by forming compound 15 with the material in which resin 16 and bamboo fiber 17 are mixed, and injection molding the same. Speaker frame 7 having characteristics of low specific gravity, high elastic modulus and high internal loss and excellent in productivity with high quality is thereby obtained. Frame 7 also has characteristics of high sound quality, large output, and high reliability.

Furthermore, light speaker 10*a* excellent in external appearance and having high productivity is realized by configuring speaker 10*a* using frame 7 having characteristics of low specific gravity, high elastic modulus, and high internal loss.

Bamboo fiber 17 used in diaphragm 1 as described in Embodiment 1 may be used for bamboo fiber 17 used in frame 7. Frame 7 is given characteristics similar to diaphragm 1 and the characteristics of speaker 10*a* enhance by including bamboo fiber 17 and microfibrillated bamboo fiber 18 in frame 7.

Diaphragm 1*a* configuring speaker 10*a* has been described as diaphragm 1*a* not containing bamboo fiber 17. However, as described in Embodiment 1, light speaker 10*a* having high productivity excellent in external appearance in which the degree of freedom in adjustment of characteristics and sound quality is large, and humidity resistance reliability and strength are ensured is realized by using diaphragm 1 containing bamboo fiber 17 in speaker 10*a*.

Embodiment 3

Embodiment 3 of the present invention will be described using the drawings. The configurations similar to Embodiments 1 and 2 are denoted with similar reference numerals, and the detailed description will be omitted.

Figure 8:
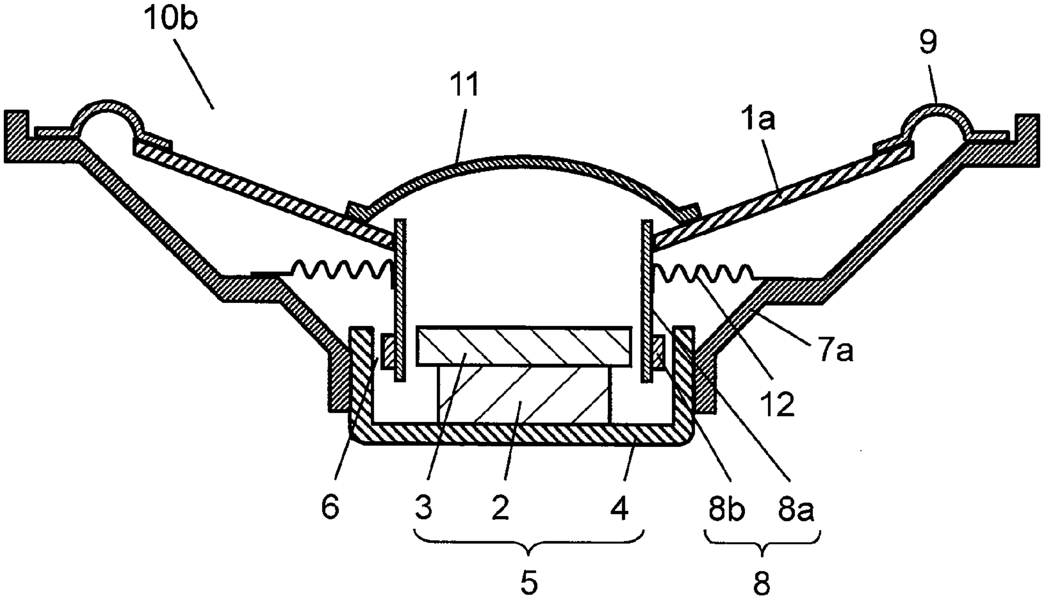
FIG. 8 is a cross-sectional view of a speaker according to Embodiment 3 of the present invention.
Figure 9:
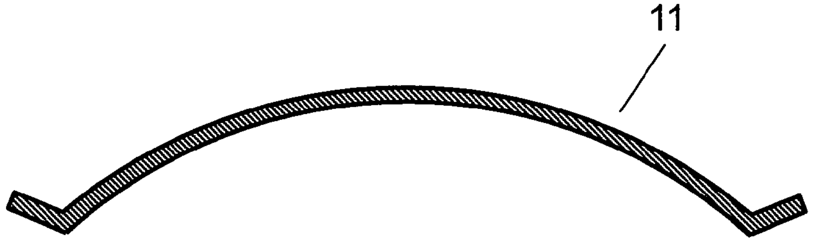
FIG. 9 is a cross-sectional view of a speaker dust cap used in the speaker shown in FIG. 8.
Figure 10:
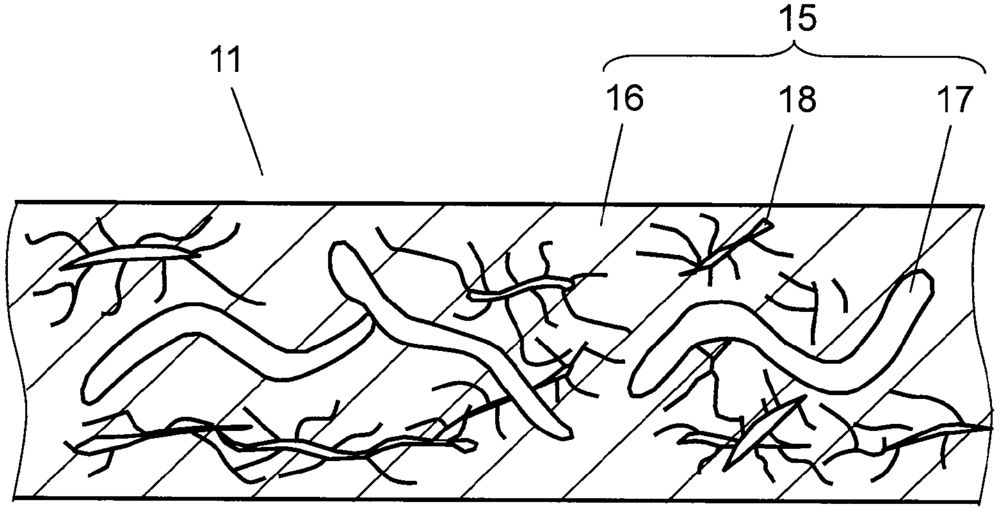
FIG. 10 is a partially detailed cross sectional view of the speaker dust cap shown in FIG. 9.

FIG. 8 is a cross-sectional view of speaker 10*b* according to Embodiment 3 of the present invention. FIG. 9 is a cross-sectional view of speaker dust cap 11 (hereinafter referred to as cap 11) used in speaker 10*b* shown in FIG. 8. FIG. 10 is a partially detailed cross sectional view of cap 11 shown in FIG. 9.

As compared to speaker 10 according to Embodiment 1, speaker 10*b* according to Embodiment 3 has diaphragm 1 replaced with speaker diaphragm 1*a*, and cap 11*a* replaced with cap 11. Other configurations of speaker 10*b* according to Embodiment 3 have configurations similar to speaker 10 according to Embodiment 1. As compared to speaker 10*a* according to Embodiment 2, speaker 10*b* according to Embodiment 3 has frame 7 replaced with frame 7*a*, and cap 11*a* replaced with cap 11. Other configurations of speaker 10*b* according to Embodiment 3 have configurations similar to speaker 10*a* according to Embodiment 2.

Diaphragm 1*a* includes resin 16 but does not include bamboo fiber 17. Frame 7*a* includes resin 16 but does not include bamboo fiber 17. Furthermore, similar to diaphragm 1 and frame 7, cap 11 is made from compound 15 in which resin 16 and bamboo fiber 17, which is a cellulose fiber, are mixed. The mechanical rigidity of cap 11 enhances by forming cap 11 by mixing bamboo fiber 17 to resin 16. Moreover, the rigidity of cap 11 further enhances by including microfibrillated bamboo fiber 18 miniaturized to the microfibrillated state. As cap 11 includes bamboo fiber 17 or fiber 18, speaker 10*b* of light weight and large internal loss compared to when including an inorganic filler is realized. Cap 11 is preferably formed by injection molding compound 15.

Bamboo fiber 17 used in diaphragm 1 as described in Embodiment 1 can be used for bamboo fiber 17 used in cap 11. Cap 11 is given characteristics similar to diaphragm 1 and frame 7, and the characteristics of speaker 10*b* enhance by including bamboo fiber 17 and fiber 18 in cap 11.

Bamboo powder 19 or bamboo charcoal 20 may be used for a part of or all of bamboo fiber 17. When bamboo powder 19 or bamboo charcoal 20 is used in cap 11, the fluidity when formed through injection molding enhances and the moldability improves as compared to cap 11 formed only with bamboo fiber 17 if the concentration of the bamboo component of cap 11 is the same.

Resin 16 preferably uses a crystalline or non-crystalline olefin resin. Satisfactory moldability of cap 11 is realized by using the olefin resin for resin 16. The crystalline resin and/or the non-crystalline resin are used depending on the application of resin 16. Thus, resin 16 satisfies an optimum characteristic value for a resin material.

Polypropylene is used for resin 16. The PP is generally easily available, and is easily injection molded. Furthermore, inexpensive cap 11 excellent in moldability and having a relatively high heat resistance is easily obtained by using PP for resin 16. However, the material selected for resin 16 is not limited to PP. The material selected for resin 16 may be appropriately selected such that a desired characteristic value for cap 11 is obtained.

An engineering plastic may be used for resin 16. Cap 11 excellent in heat resistance or solvent resistance is obtained by using the engineering plastic for resin 16. Examples of the engineering plastic used in resin 16 include polyacetal, polyamide, polycarbonate and polybutyleneterephthalate.

In view of environmental consideration, resin 16 may use a biodegradable plastic typified by polylactic acid. Environment-friendly cap 11 of high performance that does not require a special disposal method and that avoids extra discharge of carbon dioxide in disposal is obtained by using a biodegradable plastic for resin 16. Other than polylactic acid, the biodegradable plastic may be polycaprolactam, a modified polyvinyl alcohol, casein plastics, and the like. The polylactic acid excels in transparency and rigidity as compared to other biodegradable plastic. The polylactic acid also has satisfactory compatibility with the cellulose of bamboo fiber 17, and thus easily fixes on the surface of bamboo fiber 17. Thus, environment-friendly cap 11 having high rigidity in which the external appearance color of bamboo fiber 17 is not affected is obtained by using polylactic acid for resin 16.

Cap 11 that reproduces natural and light tone is obtained by including bamboo fiber 17 in cap 11. Thus, a dark and standardized tone is suppressed as compared to the speaker dust cap formed only with resin 16. Furthermore, cap 11 having high elastic modulus compared to the speaker dust cap including other pulp material is obtained. Thus, the degree of freedom for adjusting the characteristics of cap 11 increases.

The entanglement between bamboo fibers 17 becomes stronger by mixing fiber 18 in mixed cap 11. As a result, cap 1 with large strength and elastic modulus is obtained. Therefore, cap 11 with enhanced sound pressure level in the high tone region as acoustic feature is obtained. Consequently, speaker 10*b* having clear and powerful sound quality in the high tone region is obtained.

The fiber length of fiber 18 mixed in cap 11 is preferably greater than or equal to 0.2 mm and smaller than or equal to 3 mm. The effect of heating granulation when obtaining compound 15 mixed with resin 16 and bamboo fiber 17 is efficiently produced by including fiber 18 having a fiber length in a range of greater than or equal to 0.2 mm and smaller than or equal to 3 mm for cap 11. The productivity and the quality of cap 11 also enhance.

The average fiber diameter of fiber 18 to be mixed in cap 11 is preferably smaller than or equal to 10 μm. Fiber 18 having a relatively large aspect ratio and high elastic modulus can be expected. Therefore, the synergistic effect of higher elastic modulus of a single body of fiber 18 and enhanced bonding strength between the fibers is obtained if the average fiber diameter of fiber 18 to be mixed in cap 11 is smaller than to equal to 10 μm, and cap 11 having higher elastic modulus is obtained.

The mixing ratio of bamboo fiber 17 with respect to resin 16 used in cap 11 is preferably greater than or equal to 5% by weight and smaller than or equal to 70% by weight. If the blending ratio of resin 16 and bamboo fiber 17 is in a range of greater than or equal to 5% by weight and smaller than or equal to 70% by weight, the kneading effect when resin 16 and bamboo fiber 17 are kneaded can be efficiently produced. Furthermore, the productivity and the quality of cap 11 are improved. Bamboo powder 19 or bamboo charcoal 20 is preferably mixed in bamboo fiber 17 if the blending ratio of bamboo fiber 17 excesses 60% by weight.

If the mixing ratio of bamboo fiber 17 is less than 5% by weight, the effect of including bamboo fiber 17 is barely produced. If the mixing ratio of bamboo fiber 17 is greater than 70% by weight, a long time is required for the kneading of resin 16 and bamboo fiber 17. Furthermore, as molding of cap 11 using injection molding becomes difficult, the productivity and dimension stability lower, and the degree of freedom in the shape of cap 11 decreases.

Moreover, when reinforcing cap 11, when giving a slight accent to the reproduction sound of speaker 10*b*, when performing sound quality adjustment by providing a peak to the sound pressure frequency characteristics, and the like, reinforcing material 68 may be mixed in compound 15. Reinforcing material 68 may be mica, titanium dioxide, and the like. The elastic modulus of cap 11 becomes higher if mica or titanium dioxide is used for reinforcing material 68.

Coloring agent 71 such as a pigment may be mixed in compound 15. The color of cap 11 is adjusted by including coloring agent 71. In particular, so-called bamboo-colored cap 11 is obtained by including coloring agent 71 having a green component. Coloring agent 71 to be mixed is preferably an organic phthalocyanine green or a mixture of phthalocyanine blue and titanium yellow.

Through combination of such materials, the characteristic value of cap 11 can be freely adjusted at high accuracy. Speaker 10*b* having the predetermined characteristics and the sound quality is thus easily obtained.

Therefore, the present invention forms cap 11 by forming compound 15 with the material in which resin 16 and bamboo fiber 17 are mixed, and injection molding the same. The degree of freedom in setting the characteristic value of the cap 11 increases, and in particular, high internal loss and humidity resistance reliability of resin 16 are ensured while achieving high elastic modulus or the feature of bamboo fiber 17. Cap 11 excellent in external appearance and having enhanced productivity and dimension stability is obtained. Cap 11 also has characteristics of high sound quality, large output, and high reliability.

Speaker 10*b* using cap 11 having sufficient rigidity and toughness is configured by forming speaker 10*b* using cap 11. The sound pressure level in high tone region thus enhances. As a result, speaker 10*b* having clear and powerful sound quality in the high tone region is thus obtained. Furthermore, speaker 10*b* also reproduces clear deep bass in the low tone region. Speaker 10*b* has an excellent sound quality with satisfactory sound image localization having high clarity and definite edge as a whole. Speaker 10*b* also reproduces tone with reduced distortion feeling.

Diaphragm 1*a* and frame 7*a* configuring speaker 10*b* have been described as diaphragm 1*a* and frame 7*a* not containing bamboo fiber 17. However, as described in Embodiment 1 or 2, light speaker 10*b* having high productivity excellent in external appearance in which the degree of freedom in adjustment of sound quality is large, and humidity resistance reliability and strength are ensured is realized by using diaphragm 1 containing bamboo fiber 17, or frame 7 containing bamboo fiber 17 in speaker 10*b*.

Embodiment 4

Embodiment 4 of the present invention will be described using the drawings. The same reference numerals are denoted for the configurations same as Embodiments 1 to 3, and the detailed description will be omitted.

Figure 11:
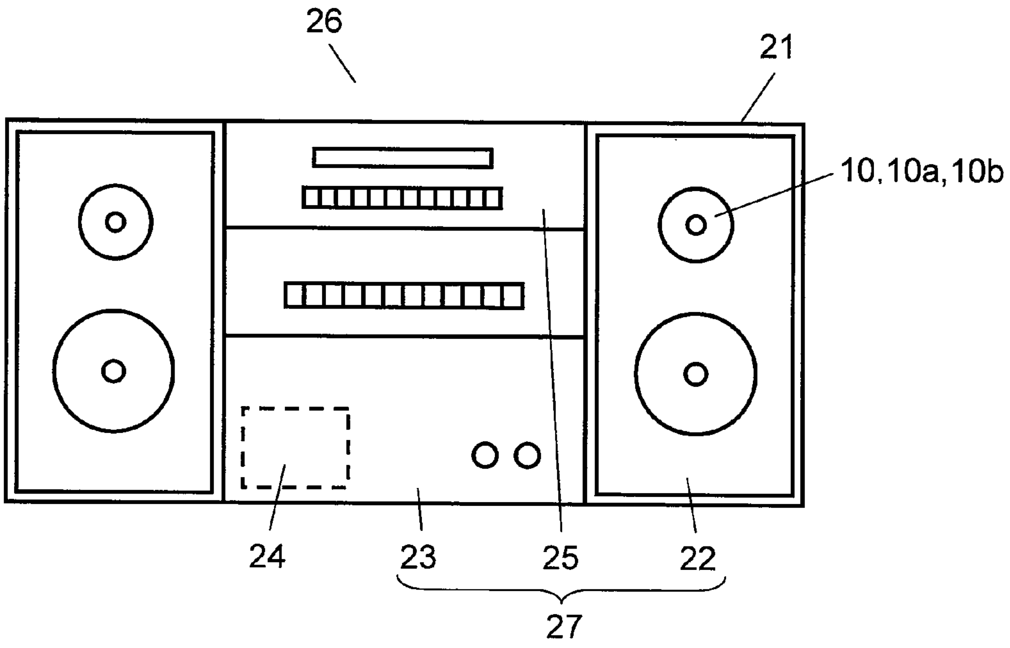
FIG. 11 is an external appearance view of a device according to Embodiment 4 of the present invention.

FIG. 11 is an external appearance view of an electronic equipment in Embodiment 4 of the present invention. As shown in FIG. 11, audio mini-component system 26 (hereinafter referred to as component 26) serving as the electronic equipment includes speaker system 21 (hereinafter referred to as system 21), amplifier 23, and operation unit 25. Speaker 10, 10*a*, 10*b* is incorporated in enclosure 22 to configure system 21. Amplifier 23 includes amplifier circuit 24 for amplifying an electric signal to input to system 21. Operation unit 24 including a player outputs a source to input to amplifier 23. Amplifier 23, operation unit 25, and enclosure 22 configure main body 27 of component 26. Speaker 10, 10*a*, 10*b* is attached to main body 27. Speaker 10, 10*a*, 10*b* described in the Embodiments 1 to 3 may be used for speaker 10, 10*a*, 10*b*. Voice coil 8 of speaker 10, 10*a*, 10*b* is supplied with power from amplifier 23 of main body 27. This causes diaphragm 1, 1*a* to emit sound. According to such configuration, component 26 having highly accurate characteristics, sound and design that are not realized in the convention of the related art is obtained.

Audio mini-component 26 has been described as an example where speaker 10, 10*a*, 10*b* is applied to an electronic equipment. However, the application example of speaker 10, 10*a*, 10*b* to an equipment is not limited thereto. For instance, application can be made to a portable audio equipment that can be carried around, charging system thereof, and the like. Furthermore, application can be widely made and developed to video equipments such as liquid crystal television and plasma display television, information communication equipments such as mobile telephone, electronic equipments such as computer related equipment, and the like.

Embodiment 5

Embodiment 5 of the present invention will be described using the drawings. The same reference numerals are denoted for the configurations same as Embodiments 1 to 4, and the detailed description will be omitted.

Figure 12:
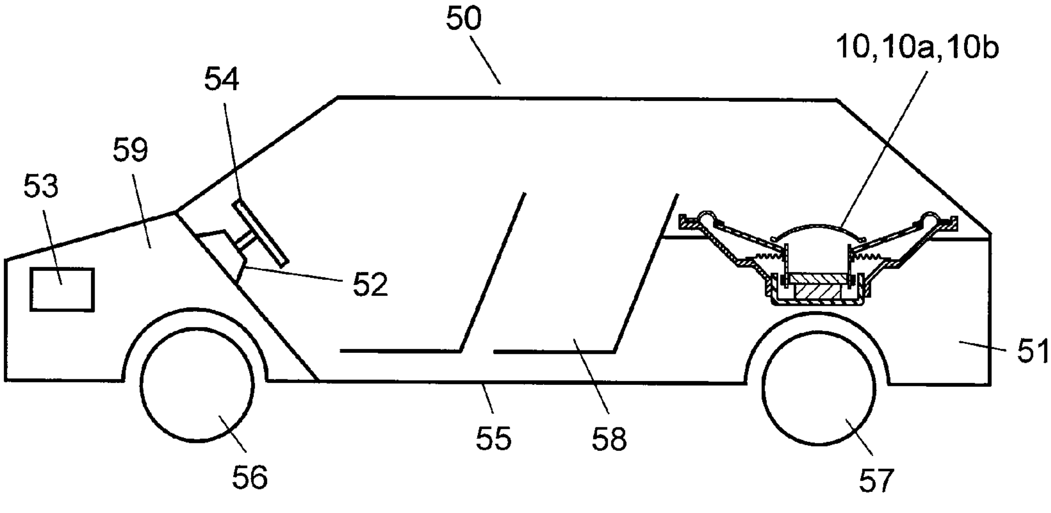
FIG. 12 is a cross-sectional view of a device according to Embodiment 5 of the present invention.

FIG. 12 is a cross-sectional view of automobile 50 serving as a moving body device according to Embodiment 5 of the present invention. As shown in FIG. 12, automobile 50 includes body 55, seat 58, drive unit 53, steering 54, front wheel 56, and rear wheel 57. Seat 58 and steering 54 are installed in a vehicle interior arranged in body 55, and drive unit 53 is installed in machine room 59 arranged in body 55. Steering 54 operates front wheel 56 which is a steering wheel. Drive unit 53 includes an engine or a motor, and drives rear wheel 57 which is a drive wheel. Drive unit 53 may drive front wheel 56. Front wheel 56 and rear wheel 57 support body 55. Rear tray 51 arranged in the interior of body 55 of automobile 50 incorporates speaker 10, 10*a*, 10*b* to be used as a part of a car navigation system or a car audio system. In other words, speaker 10, 10*a*, 10*b* is supplied with power from automobile 50 which is a main body. That is, speaker 10, 10*a*, 10*b* is input with an input signal from automobile 50. Automobile 50 may include an amplifier circuit for amplifying the input signal. Speaker 10, 10*a*, 10*b* described in the Embodiments 1 to 3 may be used for speaker 10, 10*a*, 10*b*.

Not limited to rear tray 51, speaker 10, 10*a*, 10*b* may be attached to any location in automobile 50 such as front panel 52, door (not shown), and side panel (not shown). Automobile 50 used as a part of the car navigation system or the car audio is thereby configured.

A moving body device exhibiting the features of speaker 10, 10*a*, 10*b*, and having highly accurate characteristics, sound, and design is realized by configuring the moving body device in the above manner. As a result, enhancement of sound quality and degree of freedom in acoustic design of the moving body device such as automobile 50 mounted with speaker 10, 10*a*, 10*b* are obtained.

The moving body device mounted with speaker 10, 10*a*, 10*b* has been described using automobile 50. However, the moving body device is not limited to automobile 50, and similar effects are also obtained with moving body device such as a bicycle, a motorcycle, a train, and an airplane.

Embodiment 6

Embodiment 6 of the present invention will be described using the drawings. The same reference numerals are denoted for the configurations same as Embodiments 1 to 5, and the detailed description will be omitted.

Figure 13:
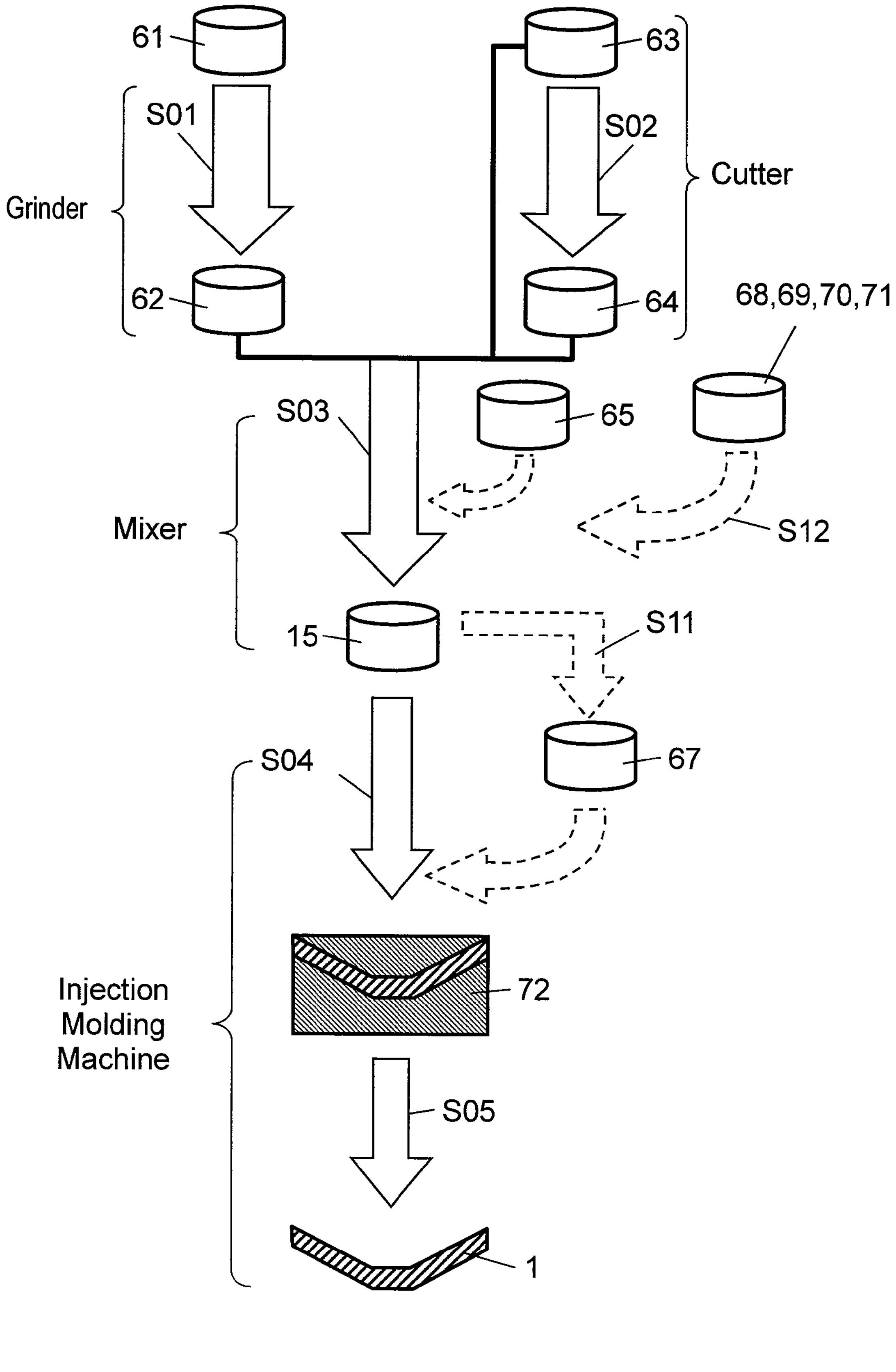
FIG. 13 is a process chart showing a method for manufacturing a speaker component according to Embodiment 6 of the present invention.
Figure 14:
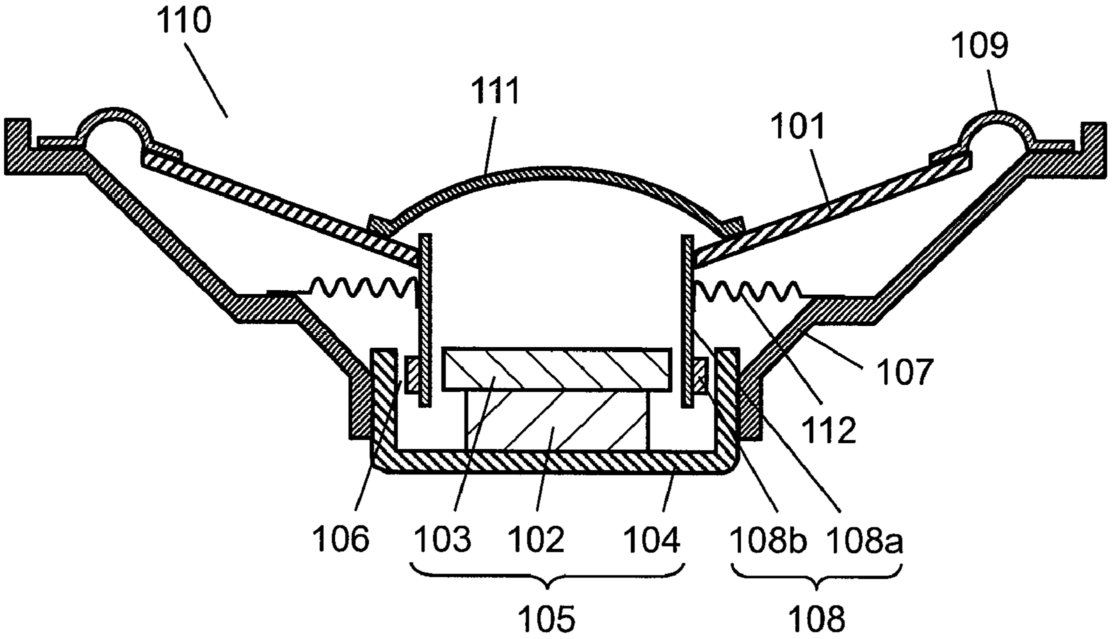
FIG. 14 PRIOR ART
FIG. 14 is a cross-sectional view of a speaker of the related art.
Figure 15:
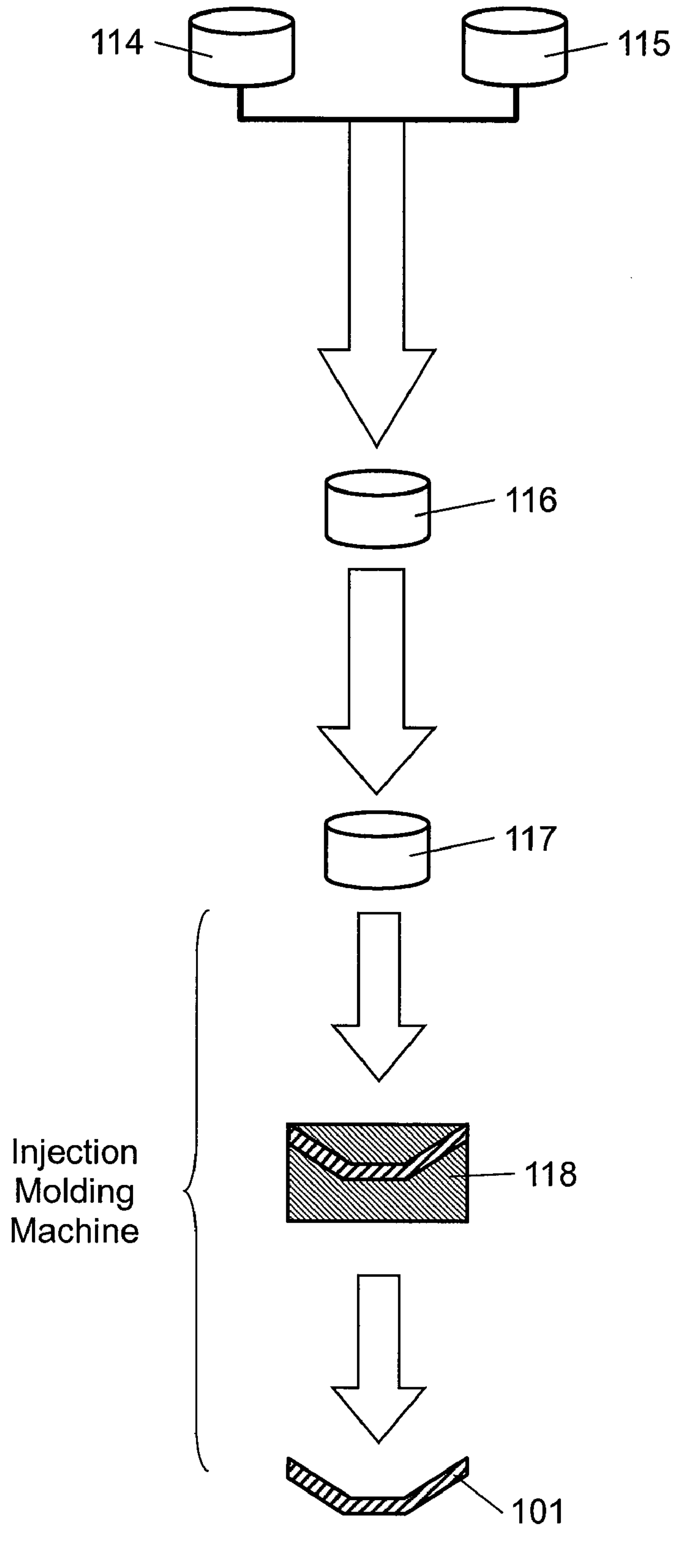
FIG. 15 PRIOR ART
FIG. 15 is a process chart showing a method for manufacturing a speaker component of the related art.

FIG. 13 is a process chart showing the method for manufacturing a speaker component according to Embodiment 6 of the present invention. A method for manufacturing speaker diaphragm 1 as a typical example of speaker component will be described below with reference to FIG. 13.

First, in the grinding step, polypropylene pellet 61, which is the material of resin 16, is grinded using a grinder to produce granulated polypropylene resin 62 (hereinafter referred to as resin 62) (step S01).

In the miniaturization step, fiber 63 is immersed in water to prepare a fiber solution (not shown) of greater than or equal to 0.5% by weight and smaller than or equal to 1.5% by weight. Fiber 63 contained in the prepared fiber solution is miniaturized to the microfibrillated state using a cutter. That is, the cutter impinges the fiber solution to the container wall at high speed at a pressure difference of greater than or equal to 10 MPa, and rapidly reduces speed. The shear force is thereby applied on fiber 63. The operation of applying the shear force to fiber 63 is repeatedly performed to generate microfibrillated fiber 64 (hereinafter referred to as fiber 64) miniaturized to the microfibrillated state (step S02).

If the concentration of fiber 63 in the fiber solution is greater than 1.5% by weight, pressure is difficult to apply on fiber 63, and fiber 63 is difficult to be microfibrillated. If the concentration of fiber 63 in the fiber solution is smaller than 0.5% by weight, the time required for micro-fibrillating becomes long. Thus, the productivity of fiber 64 is poor, thereby leading to increase in cost. Therefore, the concentration of fiber 63 in the fiber solution preferably has a concentration of greater than or equal to 0.5% by weight and smaller than or equal to 1.5% by weight. The concentration of fiber 63 in the fiber solution is adjusted by adjusting the amount of moisture (not shown) contained in the fiber solution.

In the miniaturization step, if the pressure difference applied on the fiber solution is smaller than 10 MPa, sufficient shear force is not applied on fiber 63, and thus micro-fibrillating is difficult. Furthermore, the number of times to collide on the container wall at high speed to generate fiber 64 increases, and the productivity of fiber 64 lowers.

Then, in the compounding step, resin 62, fiber 63, and fiber 64 are compounded using a mixer to produce compound 15 (step S03). The compounding step at least includes a substitution step in which resin 62 and moisture contained in fiber 64 are substituted. The adaptation of resin 62 and fiber 64 becomes satisfactory, and compounded compound 15 is efficiently generated.

In the substitution step, the moisture to be substituted is the moisture contained when miniaturizing fiber 63 to the microfibrillated state in the miniaturization step. In other words, in the substitution step, the moisture contained in resin 64 is replaced with resin 62. Thus, secondary aggregation of resin 62 or fiber 64 is prevented in the substitution step. As a result, the dispersibility of resin 62 and fibers 63, 64 configuring compound 15 improves.

The preferred method for the substitution step is a substitution method in which resin 62 and moisture contained in fiber 64 are substituted and compounded through heating and drying.

In such substitution method, resin 62, fiber 63, and fiber 64 are input to the mixer and then heated and dried. The moisture contained in fiber 64 then evaporates, and at the same time, resin 62 is thermally fused, whereby the moisture and resin 62 are substituted. As a result, the entanglement between resin 62 and fibers 63, 64 becomes strong, and the adaptation becomes more satisfactory. Resin 62, and fibers 63, 64 are mixed using the mixer. The entanglement between fiber 63 and fiber 64 then becomes stronger. As a result, resin 62 and fibers 63, 64 are efficiently compounded.

Therefore, in the compounding step, the adaptation of resin 62 and fibers 63, 64 becomes more satisfactory, and uniformly dispersed compound 15 is obtained. Compatibilizing agent 65 may be added in the compounding step. Resin 62 or fibers 63, 64 are subjected to surface treatment by adding compatibilizing agent 65, whereby adhesiveness of resin 62 and fibers 63, 64 becomes stronger. Compatibilizing agent 65 may be added to resin 62 or fibers 63, 64 before the compounding step.

The hydrolyzable long-chain alkylsilane having 6 or more carbon atoms is preferably used for compatibilizing agent 65. If the hydrolyzable long-chain alkylsilane is used for compatibilizing agent 65, for example, hexytrimethoxysilane or decyltrimethoxysilane is used. The acid modified polypropylene resin modified with acid may be used to enhance the adhesiveness of resin 62 and fibers 63, 64.

In the molding step, compound 15 is injected and molded while being heated by the injection molding machine to the inside of molding die 72 of diaphragm 1. Diaphragm 1 is thereby obtained (step S04).

Finally, in the cooling step, diaphragm 1 is cooled and solidified, and then taken out from molding die 72 (step S05). The molding step may include the cooling step.

Through the steps described above, the adaptation of resin 62 and fibers 63, 64 becomes more satisfactory, and the entanglement between the fibers becomes stronger. Thus, diaphragm 1 in which resin 62 and fibers 63, 64 are uniformly dispersed is obtained. The method for manufacturing diaphragm 1 is established as above.

The above-described manufacturing method may further include a pelletization step (step S11) before the molding step. In the pelletization step, compound 15 is again pelletized using a pellet molding machine for the purpose of further strengthening the adaptation of resin 62 and fibers 63, 64. Microfibrillated fiber compound pellet 67 (hereinafter referred to as pellet 67) of compound 15 is thereby obtained. Obtained pellet 67 is then injected in the injection molding machine in the molding step. The dispersibility of fibers 63, 64 to resin 62 further enhances by providing the pelletization step and kneading compound 15.

A mixing step (step S12) may be provided at the same time as or after the compounding step. In the mixing step, reinforcing material 68 such as mica or material such as diluting resin 69, fluidity modifier 70 (hereinafter referred to as modifier 70), and coloring agent 71 is additionally mixed in compound 15. Diaphragm 1 in which the characteristics and the functions are further improved is thereby obtained.

In other words, the rigidity of diaphragm 1 enhances by mixing reinforcing material 68 such as mica. Furthermore, blending adjustment of resin 62 and fibers 63, 64 is performed by mixing dilution resin 69, and the characteristics of diaphragm 1 are fine tuned. Thus, speaker 10 having the speaker characteristics and the sound quality complying with the respective purpose is easily obtained.

The material injection to molding die 72 in the same injecting conditions is facilitated in the molding step by mixing modifier 70. Diaphragm 1 having thin thickness or a large degree of freedom in shape is thus easily injection molded. The injecting conditions mean various conditions for injection molding such as injection pressure, injection speed, injection temperature, and the like. The external appearance color of diaphragm 1 is freely selected by mixing coloring agent 71. Diaphragm 1 excellent in designability is thus easily obtained. Moreover, reinforcing material 68, or dilution resin 69, modifier 70, and coloring agent 71 may be variously combined and mixed.

Mica, talc, graphite, and calcium carbonate may be used alone or in combination for reinforcing material 68. Clay, carbon fiber, aramid fiber, glass flake, titanium dioxide, and the like may be used for reinforcing material 68. Calcium stearate or fatty acid amide is used for modifier 70. A dye material such as a general pigment that does not change in quality at the injection temperature in the molding step is selected and used for coloring agent 71. Phthalocyanine green or a mixture of phthalocyanine blue and titanium yellow may be used for coloring agent 71.

The mixing step may be performed simultaneously with the compounding step. The mixing step may be performed between the compounding step and the pelletization step. Furthermore, dilution resin 69 other than polypropylene resin may be used and polymer blended with resin 62 in the mixing step.

Therefore, the adaptation of resin 62 and fibers 63, 64 enhances by manufacturing diaphragm 1 using the manufacturing method of the present embodiment. Resin 62 and fibers 63, 64 are thus evenly distributed. At the same time, the entanglement between fibers 63, 64 also becomes stronger. As a result, speaker 10 using diaphragm 1 has large degree of freedom in the adjustment of the speaker characteristics and the adjustment of the sound quality. Furthermore, diaphragm 1 and speaker 10 with excellent external appearance in which the reliability with respect to humidity resistance or water resistance is improved are obtained. Diaphragm 1 having characteristics of high elastic modulus and high strength is obtained while exhibiting the features of fiber 63. Diaphragm 1 is stably provided at high productivity according to the manufacturing method described above.

Diaphragm 1 is obtained as molding die 72 used in the molding step is molding die 72 for diaphragm 1. Similarly, frame 7 is obtained as molding die 72 for frame 7 is used in the molding step. Furthermore, cap 11 is obtained as molding die 72 for cap 11 is used in the molding step. Moreover, other speaker component is obtained by using molding die 72 for other speaker component such as a sub-cone in the molding step. Speaker 10, 10*a*, 10*b* is configured using such speaker components, so that speaker 10, 10*a*, 10*b* having excellent external appearance in which the degree of freedom in adjustment of characteristics and sound quality is large, the humidity resistance reliability and strength are improved, and the productivity is high is realized.

Fiber 63 may be natural fiber or chemical fiber. The natural fiber used in fiber 63 may be bamboo fiber 17, wood pulp material, or the like, because they are cellulose fibers. If bamboo fiber 17 is used for fiber 63, bamboo fiber 17 as described in Embodiments 1 to 3 may be used. If bamboo fiber 17 and fiber 18 are used for fibers 63, 64, the speaker component such as diaphragm 1, frame 7, and cap 11 will have characteristics of high elastic modulus and high strength. Bamboo fiber 17 may be bamboo pulp. The chemical fiber used in fiber 63 may be a carbon fiber, an aramid fiber, or the like. The aramid fiber may be aramid pulp.

The fiber length of fiber 63 is preferably greater than or equal to 0.2 mm and smaller than or equal to 3 mm. The effect of heating granulation when obtaining compound 15 is efficiently produced by including fiber 64 having a fiber length in a range of greater than or equal to 0.2 mm and smaller than or equal to 3 mm for compound 15. The productivity and the quality of the speaker component such as diaphragm 1 are also improved.

If the fiber length of fiber 64 is shorter than 0.2 mm, the effect of fiber 64 is not efficiently produced, and the speaker component of high elastic modulus is hardly obtained. If, on the other hand, the fiber length of fiber 64 is longer than 3 mm, secondary aggregation that occurs from the entanglement between fibers 64 easily occur, and dispersion failure of fiber 64 easily occurs. Thus, a long time is required for the kneading of resin 62 and fiber 63. An aggregate of fiber 64 may appear on the surface of the speaker component, thereby affecting the external appearance of speaker 10, 10*a*, 10*b*. Therefore, the productivity and the quality of the speaker component such as diaphragm 1 enhance if the fiber length of fiber 64 to be mixed in compound 15 is within a range of greater than or equal to 0.2 mm and smaller than or equal to 3 mm.

Resin 62 preferably uses a crystalline or non-crystalline olefin resin. Satisfactory moldability of the speaker component such as diaphragm 1 is realized by using the olefin resin for resin 62. The crystalline resin and/or the non-crystalline resin are used depending on the application of resin 62. Thus, resin 62 satisfies an optimum characteristic value for a resin material.

The PP is generally easily available, and is easily injection molded. Furthermore, the speaker component having large internal loss is obtained by using PP for resin 62. However, the material of resin 62 is not limited to PP. The material of resin 62 may be appropriately selected such that a desired characteristic value for the speaker component such as diaphragm 1 is obtained.

An engineering plastic may be used for resin 62, not limited to PP. The speaker component excellent in heat resistance or solvent resistance is obtained by using the engineering plastic for resin 62. The engineering plastic used in resin 62 may include polyacetal, polyamide, polycarbonate, polybutyleneterephthalate.

In view of environmental consideration, resin 62 may use a biodegradable plastic typified by polylactic acid. An environment-friendly speaker component having high performance that does not require a special disposal method and that avoids extra discharge of carbon dioxide in disposal is obtained by using a biodegradable plastic for resin 62. Other than polylactic acid, the biodegradable plastic may be polycaprolactam, modified polyvinyl alcohol, casein plastics, and the like. The polylactic acid excels in transparency and rigidity compared to other biodegradable plastic. The polylactic acid also has satisfactory compatibility with the cellulose contained in fiber 63, and thus easily fixes on the surface of fiber 63. Thus, an environment-friendly speaker component such as diaphragm 1 having high rigidity in which the external appearance color of fiber 63 is not affected is obtained by using polylactic acid for resin 62.

INDUSTRIAL APPLICABILITY

The speaker diaphragm, the speaker frame, the speaker dust cap, the speaker, and the device according to the present invention are applied to a video acoustic equipment that requires highly accurate characteristic generation and sound generation or electronic equipment such as information communication device, and a moving body device such as an automobile.

The invention claimed is:

1. A speaker diaphragm comprising:

a resin; and a plurality of cellulose fibers each having an elongated shape, wherein the cellulose fibers contain a microfibrillated bamboo fiber miniaturized to a microfibrillated state.

2. The speaker diaphragm according to claim 1, wherein the resin is a crystalline or non-crystalline olefin resin.

3. The speaker diaphragm according to claim 1, wherein the resin is a biodegradable plastic.

4. The speaker diaphragm according to claim 3, wherein the biodegradable plastic is a polylactic acid.

5. The speaker diaphragm according to claim 1, wherein the cellulose fibers further contain a bamboo powder.

6. The speaker diaphragm according to claim 5, wherein the bamboo powder is a bamboo charcoal carbonized from the bamboo powder.

7. The speaker diaphragm according to claim 1, wherein a mixing ratio of the bamboo fiber with respect to the resin is greater than or equal to 5% by weight and smaller than or equal to 60% by weight.

8. The speaker diaphragm according to claim 7, wherein the cellulose fibers further contain a bamboo powder.

9. The speaker diaphragm according to claim 1, further comprising:

a reinforcing material.

10. The speaker diaphragm according to claim 9, wherein the reinforcing material is at least one of a mica, a graphite, a talc, a calcium carbonate, a clay, a carbon fiber, or an aramid fiber.

11. The speaker diaphragm according to claim 1, wherein the cellulose fibers further contain further bamboo fibers which are not microfibrillated, and the microfibrillated bamboo fiber bonds the further bamboo fibers to each other.

12. The speaker diaphragm according to claim 1, wherein the cellulose fibers further contain further bamboo fibers which are not microfibrillated, and the microfibrillated bamboo fiber bonds the further bamboo fibers to the resin.

13. A speaker comprising:

a magnetic circuit;

a frame coupled to the magnetic circuit;

a diaphragm, containing a resin and a plurality of cellulose fibers each having an elongated shape, coupled to an outer peripheral portion of the frame; and a voice coil coupled to the diaphragm and arranged in a magnetic gap formed by the magnetic circuit, wherein the cellulose fibers contain a microfibrillated bamboo fiber miniaturized to a microfibrillated state.

14. The speaker according to claim 13, wherein the resin is a biodegradable plastic.

15. The speaker according to claim 14, wherein the biodegradable plastic is a polylactic acid.

16. The speaker according to claim 13, wherein the cellulose fibers further contain a bamboo powder.

17. The speaker according to claim 16, wherein the bamboo powder is a bamboo charcoal carbonized from the bamboo powder.

* * * * *